US009661206B2

(12) United States Patent
Tanaka et al.

(10) Patent No.: US 9,661,206 B2
(45) Date of Patent: May 23, 2017

(54) SYNCHRONOUS PHOTOGRAPHING SYSTEM THAT CONTROLS SYNCHRONOUS PHOTOGRAPHING BY PLURALITY OF IMAGE CAPTURE APPARATUS

(71) Applicant: CASIO COMPUTER CO., LTD., Shibuya-ku, Tokyo (JP)

(72) Inventors: Hitoshi Tanaka, Tokyo (JP); Kazuaki Hagiwara, Tokyo (JP); Kazuya Nara, Tokyo (JP); Toshiya Kiso, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/857,701

(22) Filed: Sep. 17, 2015

(65) Prior Publication Data

US 2016/0088209 A1 Mar. 24, 2016

(30) Foreign Application Priority Data

Sep. 24, 2014 (JP) .................................. 2014-194439

(51) Int. Cl.
*H04N 5/232* (2006.01)
*H04N 5/04* (2006.01)
(Continued)

(52) U.S. Cl.
CPC ..... *H04N 5/23203* (2013.01); *H04N 5/23293* (2013.01); *H04N 5/247* (2013.01); *H04N 17/002* (2013.01)

(58) Field of Classification Search
CPC ........... H04N 5/23203; H04N 5/23293; H04N 5/247; H04N 5/23245; H04N 5/23296
(Continued)

(56) References Cited

U.S. PATENT DOCUMENTS

2004/0183908 A1 9/2004 Tominaga et al.
2011/0205380 A1 8/2011 Shirakawa
(Continued)

FOREIGN PATENT DOCUMENTS

JP 2003324649 A 11/2003
JP 2004266458 A 9/2004
(Continued)

OTHER PUBLICATIONS

Related U.S. Appl. No. 14/857,711; First Named Inventor: Hitoshi Tanaka; Title: "Photographing Control Apparatus That Controls Synchronous Photographing by Plurality of Image Capture Apparatus"; filed Sep. 17, 2015.
(Continued)

Primary Examiner — Rochelle-Ann J Blackman
(74) Attorney, Agent, or Firm — Holtz, Holtz & Volek PC

(57) ABSTRACT

A synchronous photographing system includes an operation terminal that performs a photographing operation; and a plurality of image capture apparatuses that performs synchronous photographing in response to an instruction from the operation terminal, in which, among the plurality of image capture apparatuses, one of a plurality of image capture apparatuses participating in synchronous photographing is set as a main image capture apparatus and other image capture apparatuses are set as sub image capture apparatuses, the main image capture apparatus performs control to perform synchronization of a photographing timing among the plurality of image capture apparatuses participating in synchronous photographing, and the operation terminal performs control to instruct the plurality of image capture apparatuses to perform instruction contents from a user.

10 Claims, 18 Drawing Sheets

(51) Int. Cl.
*H04N 5/247* (2006.01)
*H04N 17/00* (2006.01)

(58) Field of Classification Search
USPC ............... 396/56, 58, 59; 348/211.2, 211.8,
348/211.99, 211.4, 211.14
See application file for complete search history.

(56) References Cited

U.S. PATENT DOCUMENTS

| | | |
|---|---|---|
| 2013/0242135 A1 | 9/2013 | Muraki et al. |
| 2016/0021292 A1* | 1/2016 | Zhang ............... H04N 5/23206 348/211.2 |

FOREIGN PATENT DOCUMENTS

| | | | |
|---|---|---|---|
| JP | 2006217356 A | 8/2006 |
| JP | 2007235449 A | 9/2007 |
| JP | 2009296323 A | 12/2009 |
| JP | 2011172123 A | 9/2011 |
| JP | 2012070336 A | 4/2012 |
| JP | 2012123131 A | 6/2012 |
| JP | 2013187826 A | 9/2013 |
| JP | 2013225826 A | 10/2013 |

OTHER PUBLICATIONS

Japanese Office Action (and English translation thereof) dated Aug. 30, 2016, issued in Japanese Application No. 2014-194439.
Japanese Office Action (and English translation thereof) dated Aug. 23, 2016, issued in Japanese Application No. 2014-194440.

* cited by examiner

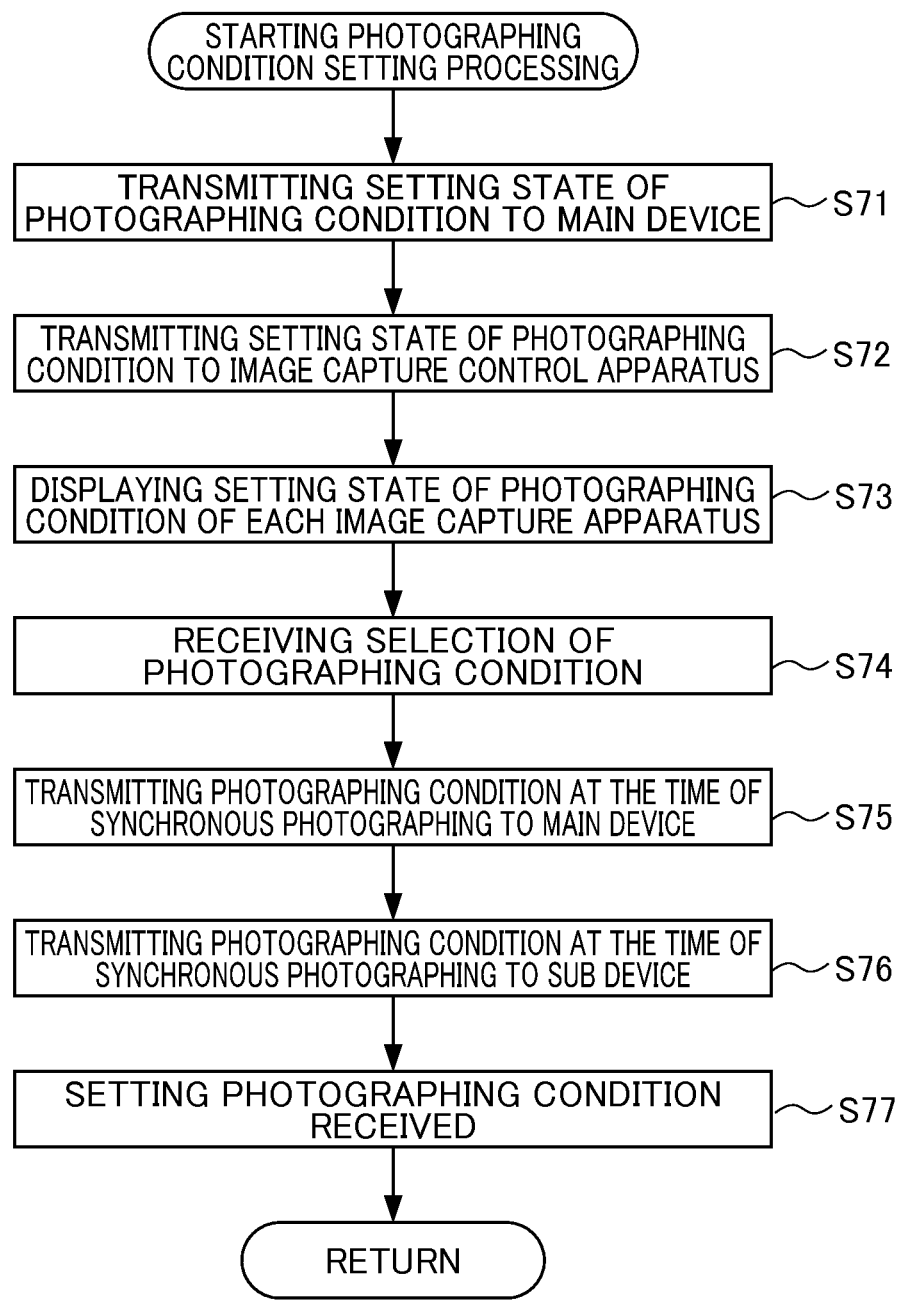

FIG. 15A BEFORE SYNCHRONIZATION AT TIMING CONTROL UNIT
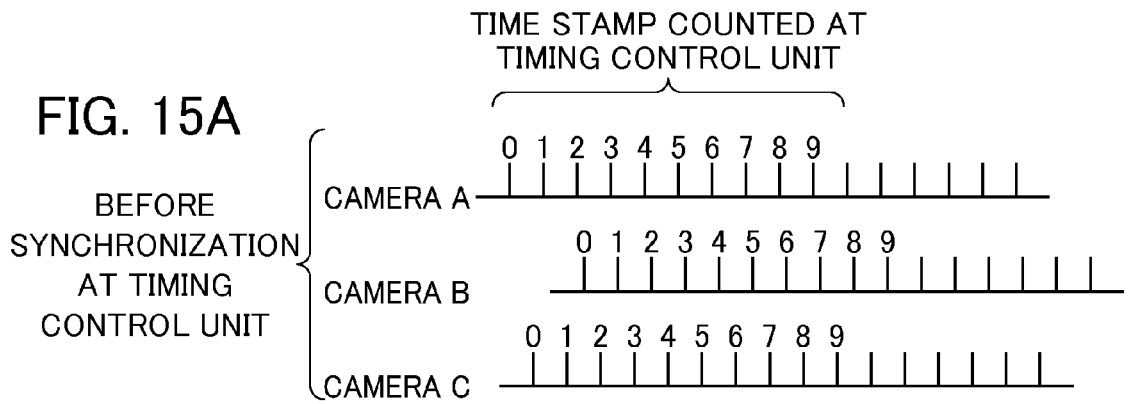
FIG. 15B AFTER SYNCHRONIZATION AT TIMING CONTROL UNIT
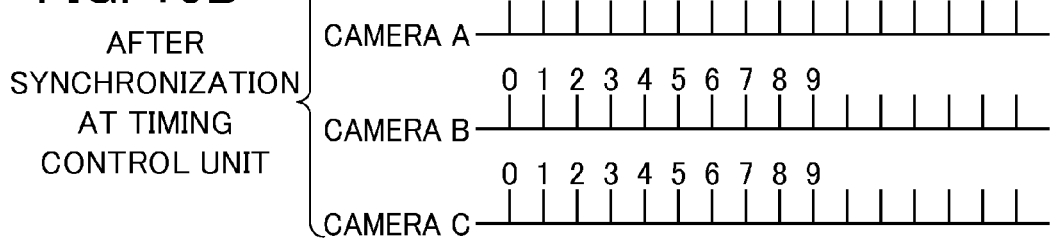
FIG. 15C TEST SHUTTER
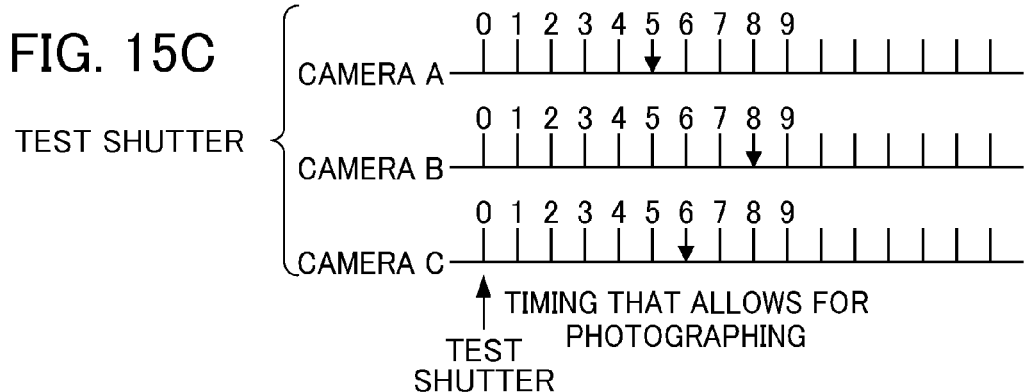
FIG. 15D LIVE SHUTTER
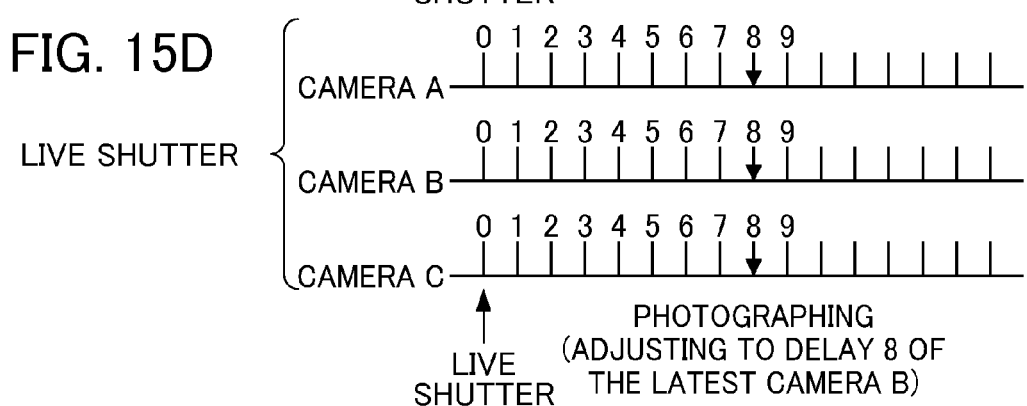

SYNCHRONOUS PHOTOGRAPHING SYSTEM THAT CONTROLS SYNCHRONOUS PHOTOGRAPHING BY PLURALITY OF IMAGE CAPTURE APPARATUS

This application is based on and claims the benefit of priority from Japanese Patent Application No. 2014-194439, filed on 24 Sep. 2014, the content of which is incorporated herein by reference.

BACKGROUND OF THE INVENTION

Field of the Invention

The present invention relates to a synchronous photographing system that controls synchronous photographing by a plurality of image capture apparatuses, an operation terminal, and a synchronous photographing method.

Related Art

Conventionally, synchronous photographing has been performed that photographs in synchronization with a plurality of image capture apparatuses. For the purpose of angle switching, synthesis editing, etc., such synchronous photographing has been performed for synchronizing and replaying images photographed by a plurality of image capture apparatuses corresponding to multiple viewpoints.

In order to achieve synchronization in photographing, Japanese Unexamined Patent Application, Publication No. 2013-225826 discloses an imaging device that synchronizes a reference time based on GPS signals.

SUMMARY OF THE INVENTION

According to one aspect of the present invention is a synchronous photographing system comprising: an operation terminal that performs a photographing operation; and a plurality of image capture apparatuses that performs synchronous photographing in response to an instruction from the operation terminal, in which:

among the plurality of image capture apparatuses, one of a plurality of image capture apparatuses participating in synchronous photographing is set as a main image capture apparatus and other image capture apparatuses are set as sub image capture apparatuses, the main image capture apparatus performs control to perform synchronization of a photographing timing among the plurality of image capture apparatuses participating in synchronous photographing, and the operation terminal performs control to instruct the plurality of image capture apparatuses to perform instruction contents from a user.

Furthermore, another aspect of the present invention is an operation terminal that includes:

an output unit that performs a screen display;

a communication unit that performs wireless communication among a plurality of image capture apparatuses;

a control unit that acquires identification information from each of the plurality of image capture apparatuses by way of the communication unit, lists and displays the identification information of each of the plurality of image capture apparatuses acquired on a screen display at the output unit, and selects a plurality of image capture apparatuses to participate in synchronous photographing in response to a user's operation; and an input unit that instructs to execute synchronous photographing by a plurality of image capture apparatuses selected by the selection unit by the wireless communication unit in response to a user's operation.

Furthermore, still another aspect of the present invention is a synchronous photographing method executed by a synchronous photographing system including: an operation terminal that performs a photographing operation; and a plurality of image capture apparatuses that performs synchronous photographing in response to an instruction from the operation terminal, in which the method includes:

among the plurality of image capture apparatuses, setting one of a plurality of image capture apparatuses participating in synchronous photographing as a main image capture apparatus and other image capture apparatuses as sub image capture apparatuses, in the main device image capture apparatus, performing control to perform synchronization of a photographing timing among the plurality of image capture apparatuses participating in synchronous photographing, and in the operation terminal, performing control to instruct the plurality of image capture apparatuses to perform instruction contents from a user.

Furthermore, yet another aspect of the present invention is a synchronous photographing method that can be executed by a synchronous photographing system including: an operation terminal that performs a photographing operation; and a plurality of image capture apparatuses that performs synchronous photographing in response to an instruction from the operation terminal, in which the method includes:

in a case of performing wireless communication between any apparatuses including the operation terminal that performs a photographing operation and the plurality of image capture apparatuses in response to an instruction from the operation terminal, setting such that one of the plurality of image capture apparatuses participating in synchronous photographing is set as an access point for wireless communication and other image capture apparatuses other than the image capture apparatus which was set as an access point for the wireless communication and the operation terminal are set as stations for wireless communication.

BRIEF DESCRIPTION OF THE DRAWINGS

FIG. 11 is a flowchart illustrating a flow of image capture condition setting processing by an image capture control apparatus and an image capture apparatus, in the flow of the synchronous control processing executed by the image capture control system of FIG. 1 and FIG. 2 having the functional configuration of the FIG. 3;

FIGS. 15A-15D are conceptual diagrams illustrating the principle of the present invention;

DETAILED DESCRIPTION OF THE INVENTION

In the following, embodiments of the present invention will be described with reference to the drawings.

System Configuration

Figure 1:
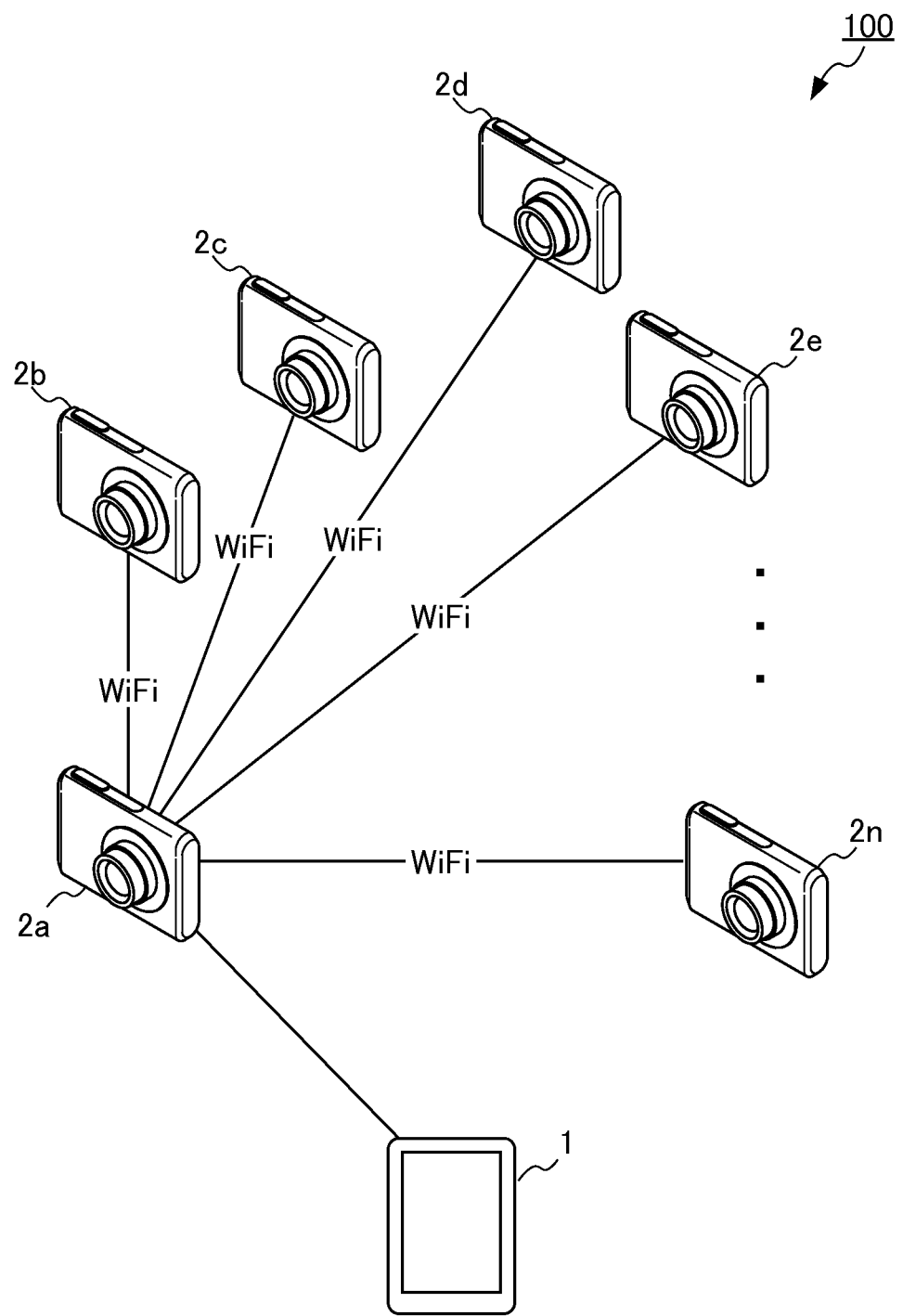
FIG. 1 is a conceptual diagram illustrating a system configuration of an image capture control system according to an embodiment of the present invention.

FIG. 1 is a system configuration view illustrating a system configuration of an image capture control system 100 according to an embodiment of the present invention.

As illustrated in FIG. 1, the image capture control system 100 is configured with an image capture control apparatus 1 and image capture apparatuses 2a to 2n. The configurations of the image capture apparatuses 2a to 2n may be referred to simply as "image capture apparatus 2" below due to being substantially identical.

The image capture control apparatus 1 and the image capture apparatus 2 are configured so as to enable mutual communication by way of wireless communication such as Wi-Fi (Wireless Fidelity), or wired communication such as by USB (Universal Serial Bus).

The image capture apparatus 2 is set to serve as a main-image capture apparatus 2 as well as sub-image capture apparatuses 2.

An image capture start signal from the image capture control apparatus 1 is sent from the image capture control apparatus 1 to the main-image capture apparatus 2. The image capture start signal received by the main-image capture apparatus 2 is sent from the main-image capture apparatus 2 to the sub-image capture apparatuses 2.

In the following, specific configurations will be described.

Hardware Configuration

Figure 2:
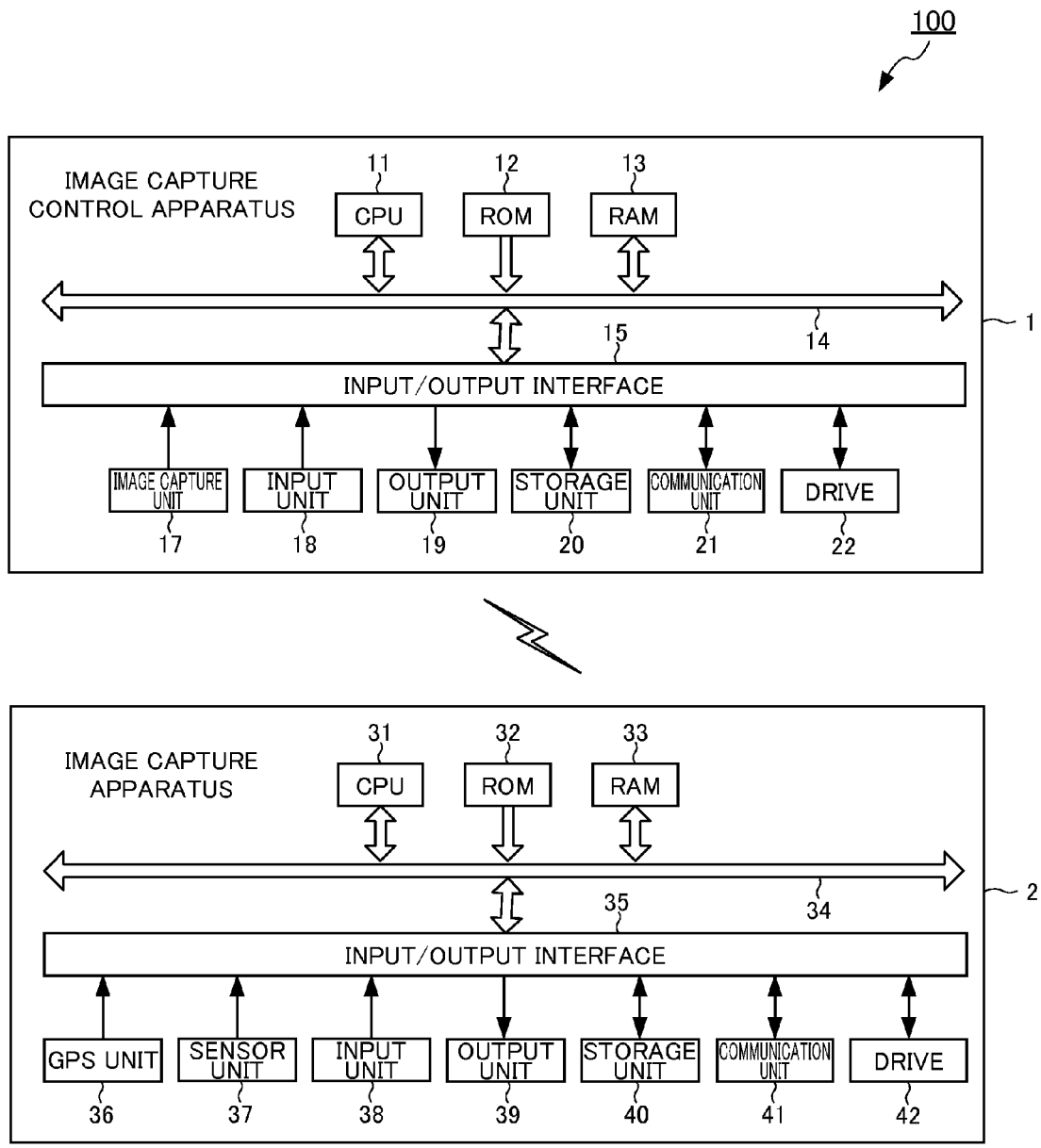
FIG. 2 is a block diagram illustrating a hardware configuration of an image capture control system according to an embodiment of the present invention.

FIG. 2 is a block diagram illustrating hardware configurations of the image capture control apparatus 1 and the image capture apparatus 2 according to an embodiment of the present invention. The image capture control apparatus 1 is configured as a tablet terminal, for example, and the image capture apparatus 2 is configured as a digital camera, for example.

The image capture control apparatus 1 includes a CPU (Central Processing Unit) 11, ROM (Read Only Memory) 12, RAM (Random Access Memory) 13, a bus 14, an input/output interface 15, an image capture unit 16, a sensor unit 17, an input unit 18, an output unit 19, a storage unit 20, a communication unit 21, and a drive 22.

The image capture apparatus 2 includes a CPU (Central Processing Unit) 31, ROM (Read Only Memory) 32, RAM (Random Access Memory) 33, a bus 34, an input/output interface 35, an image capture unit 36, a sensor unit 37, an input unit 38, an output unit 39, a storage unit 40, a communication unit 41, and a drive 42.

In the present embodiment, since the image capture control apparatus 1 and the image capture apparatus 2 have similar hardware configurations, respectively, only the hardware configuration of the image capture control apparatus 1 will be described as a representative example. It should be noted that, in the hardware configuration of the image capture apparatus 2, portions having names similar to the image capture control apparatus 1 have similar functions.

The CPU 11 executes various kinds of processing according to programs stored in the ROM 12 or programs loaded from the storage unit 20 into the RAM 13. For example, the CPU 11 executes image capture synchronous control processing according to a program for image capture synchronous control processing described later.

The CPU 11, the programs stored in the ROM 12, and the programs loaded into the RAM 13 constitute a control unit. The necessary data, etc. upon the CPU 11 executing various kinds of processing is stored in the RAM 13 as appropriate.

The CPU 11, the ROM 12, and the RAM 13 are mutually connected via the bus 14. The input/output interface 15 is also connected to the bus 14. The image capture unit 16, the sensor unit 17, the input unit 18, the output unit 19, the storage unit 20, the communication unit 21, and the drive 22 are connected to the input/output interface 15.

The image capture unit 16 (not illustrated) includes an optical lens unit and an image sensor.

In order to photograph a subject, the optical lens unit is configured with a lens that condenses light such as a focusing lens, a zoom lens, an aperture unit, a shutter unit, etc.

The focus lens is a lens that forms an image of a subject on a light receiving surface of the image sensor. The zoom lens is a lens that causes the focal length to freely change within a certain range.

Control mechanisms such as a peripheral circuit for adjusting setting parameters for focusing, a DC motor for adjusting a lens position, etc. are provided in the optical lens unit. Furthermore, a peripheral circuit for adjusting setting parameters such as exposure, white balance, etc. is provided as necessary to the optical lens unit.

The adjustment for zooming on a subject is performed by the DC motor moving a position of a zoom lens to change a focal distance so that an angle of view of a photographing target is changed.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog image signal. The variety of signal processing generates a digital signal that is then outputted as an output signal from the image capture unit 16.

The sensor unit 17 includes various types of sensors such as a temperature sensor, a three-axis acceleration sensor, a magnetic field sensor, etc.

The input unit 18 is configured by various buttons and inputs a variety of kinds of information and sound information in accordance with instruction operations by the user.

The output unit 19 is configured by the display unit, a speaker, and the like, and outputs images and sound.

The storage unit 20 is configured by a hard disk, DRAM (Dynamic Random Access Memory) or the like, and stores data of various images.

The communication unit 21 controls communication with other devices (not illustrated) via networks including the Internet.

A removable medium 30 composed of a magnetic disk, an optical disk, a magneto-optical disk, semiconductor memory or the like is installed in the drive 22, as appropriate. Programs that are read via the drive 22 from the removable medium 30 are installed in the storage unit 20, as necessary. Similarly to the storage unit 20, the removable medium 30 can also store a variety of data such as the image data stored in the storage unit 20.

Functional Configuration

Figure 3:
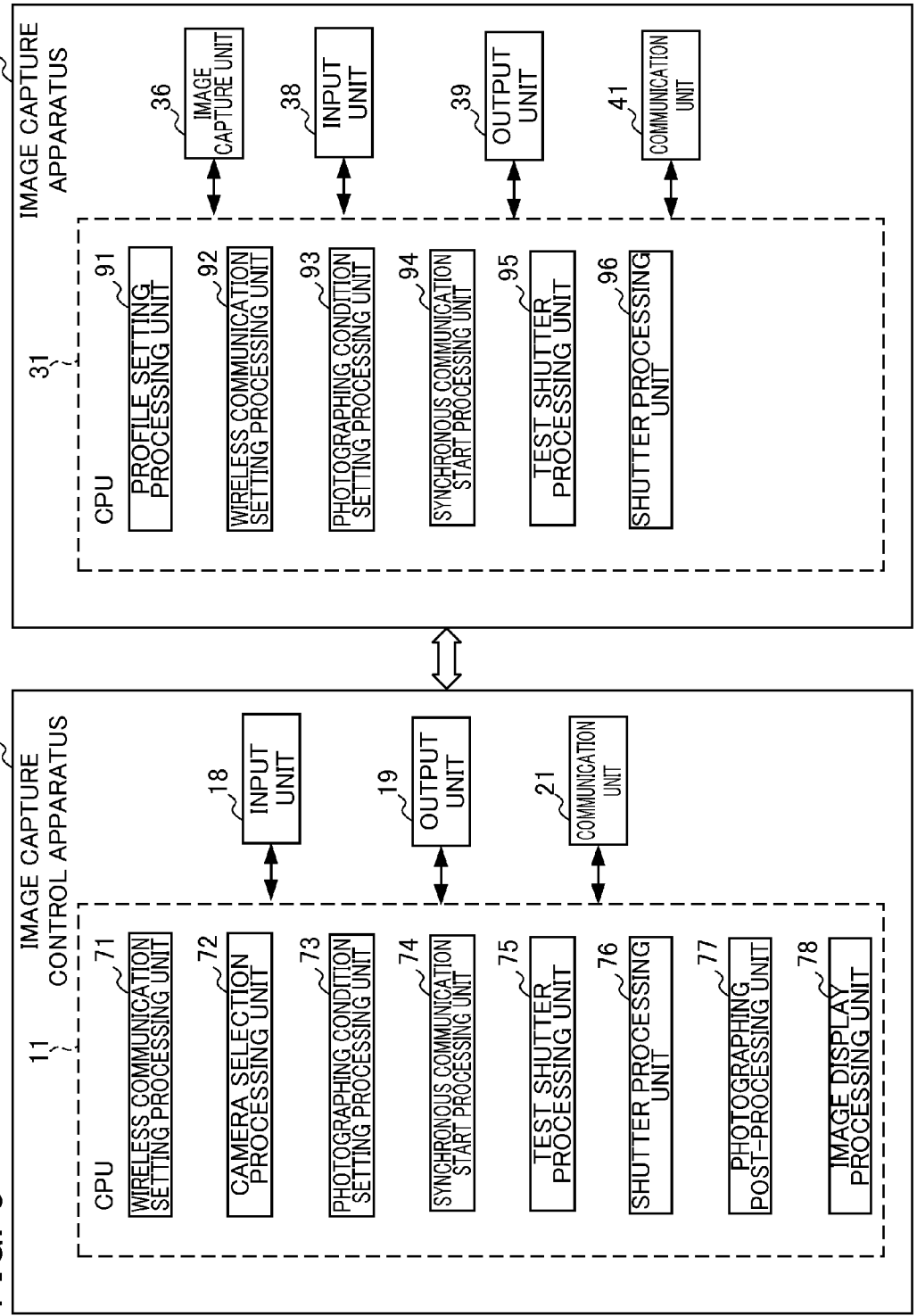
FIG. 3 is a functional block diagram illustrating a functional configuration for executing image capture synchronous control processing, among the functional configurations of the image capture control system of FIGS. 1 and 2.

FIG. 3 is a functional block diagram illustrating a functional configuration for executing image capture synchronous control processing, among the functional configurations of such an image capture control system 100.

Image capture synchronous control processing refers to a sequence of processing of controlling by way of the image capture control apparatus 1 so as to realize synchronous photographing by adjusting differences between devices from the time of receiving an image capture start signal to the time of capturing images in the plurality of image capture apparatuses 2.

As illustrated in FIG. 3, for the image capture synchronous control processing, a wireless communication setting processing unit 71, an image capture apparatus selection processing unit 72, a photographing condition setting processing unit 73, a synchronous communication start processing unit 74, a test shutter processing unit 75, a live shutter processing unit 76, a photographing post-processing unit 77, and an image display processing unit 78 function in the CPU 11 of the image capture control apparatus 1.

Furthermore, a profile setting processing unit 91, a wireless communication setting processing unit 92, a photographing condition setting processing unit 93, a synchronous communication start processing unit 94, a test shutter processing unit 95, and a live shutter processing unit 96 functions in the CPU 31 of the image capture apparatus 2.

The wireless communication setting processing unit 71 of the image capture control apparatus 1 receives a setting for performing wireless communication with the main-image capture apparatus 2 among the image capture apparatuses 2, and connects with the main-image capture apparatus 2 via the communication unit 21.

The image capture apparatus selection processing unit 72 of the image capture control apparatus 1 lists the image capture apparatuses 2 that can participate in synchronous photographing (on which the profile image setting processing and the wireless communication setting processing are performed) from among the image capture apparatuses 2 that exists on the same network, and registers the image capture apparatuses 2 to perform the image capture synchronous control processing upon receiving a user's selection.

The photographing condition setting processing unit 73 of the image capture control apparatus 1 acquires the photographing condition setting of each of the image capture apparatuses 2 for display, and receives a setting of the user's photographing condition. The photographing condition setting processing unit 73 sends the photographing condition thus received to each of the image capture apparatuses 2 via the main-image capture apparatus 2.

Herein, the photographing condition setting received may include a case in which different setting values for each of the image capture apparatuses 2 are set and a case in which a value of a shared photographing condition is set in each of the image capture apparatuses 2. The photographing condition setting may include a setting for which deciding different setting values for every photography condition thereof is allowed, and a setting for which deciding different setting values is not allowed, and a common setting value is set. It should be noted that, for a setting value shared in each of the image capture apparatuses 2, it may be configured so that a setting value of the main-image capture apparatus 2 is reflected by default.

The synchronous communication start processing unit 74 of the image capture control apparatus 1 transmits an instruction of the synchronous communication start to the main-image capture apparatus 2 using the principle of NTP (Network Time Protocol), thereby causing time differences (time differences of time stamps) accompanying propagation delay of communication of each of the image capture apparatuses 2 to the main-image capture apparatus 2 to be calculated, as well as performing time setting in each of the image capture apparatuses 2.

It should be noted that the time setting in each of the image capture apparatuses 2 may be performed not only at the beginning of the synchronous communication start processing, but also regularly for each predetermined time interval. In a case of performing the time setting regularly, it may be configured so as to continually perform until all of predetermined pieces of image data are acquired (until a main operation is carried out).

Furthermore, the synchronous communication start processing unit 74 of the image capture control apparatus 1 acquires information of a folder configuration of each of the image capture apparatuses 2, determines a folder name common to each of the image capture apparatuses 2, and transmits a folder creation instruction to create a folder with a name common to each of the image capture apparatuses 2.

More specifically, in a case of photographing independently and recording the photographed images, the synchronous communication start processing unit 74 of the image capture control apparatus 1 performs management of recording by adding, to a folder name or a file name of a photographed image newly recorded, a number arrived at by adding a predetermined number to the number used upon the last recording, in each of a plurality of the image capture apparatuses 2 that are managed by identifying a plurality of photographed images by way of folder names and file names including different numbers.

In a case of performing synchronous photographing with the plurality of image capture apparatuses, the synchronous communication start processing unit 74 of the image capture control apparatus 1 acquires the numbers used upon each of the plurality of image capture apparatuses last recording, and specifies the maximum number from among the plurality of the numbers thus acquired.

The synchronous communication start processing unit 74 of the image capture control apparatus 1 instructs to add the number, which was arrived at by adding a predetermined number to the specified number, to a folder name or a file name when each image capture apparatus records a photographed image by the synchronous photographing.

More specifically, the synchronous communication start processing unit 74 of the image capture control apparatus 1 specifies the maximum numerical characters among the numerical characters in folder names of each of the image capture apparatuses 2 acquired in Step S97. Then, the synchronous communication start processing unit 74 of the image capture control unit 1 determines a folder name from a numerical character arrived at by adding 1 to the largest numerical character thus specified and text indicating the matter of containing data from synchronous photographing. For example, the synchronous communication start processing unit 74 of the image capture control apparatus 1 instructs by determining the folder name of "101 sync" in a case in which 100 is the largest numerical character among the numerical characters of the folder names of each of the image capture apparatuses.

It should be noted that the folder which instructs the synchronous communication start processing unit 74 of the image capture control apparatus 1 to create instructs to create every time performing the synchronous photographing and folders with a folder name common to a plurality of the image capture apparatuses 2. Then, files created by performing the synchronous photographing are stored in the folder that instructs the synchronous communication start processing unit 74 of the image capture control apparatus 1 to create, and the files thus stored are stored with photographed images captured at the same timing as the same file name.

It is possible for the folders with a common name created in this way to specify the matter of the image data stored in each of the image capture apparatuses 2 being from synchronous photographing, whereby images from synchronous photographing come to be displayed based on the folders of a common name in the image display processing (described later).

The test shutter processing unit 75 of the image capture control apparatus 1 transmits a photographing preparation instruction to each of the image capture apparatuses 2 so as perform driving of a mechanism unit in advance so as become a photographing condition setting suited to photographing the surrounding environment, in response to receiving a test shutter operation by a user.

The live shutter processing unit 76 of the image capture control apparatus 1 transmits, to the main-image capture apparatus 2, a photographing instruction for the synchronous photographing, based on time differences of time stamps and clock offset calculated in the synchronous communication start processing unit 74, in response to receiving the live (actual) shutter operation by the user.

In response to receiving the selection of the image capture apparatus 2 by the user, the photographing post-processing unit 77 of the image capture control apparatus 1 acquires data of images photographed by the synchronous photographing and displays the photographed images.

It is configured so that the image display processing unit 78 of the image capture control apparatus 1 acquires images created by the synchronous photographing based on the folder name, and displays each of the image capture apparatuses 2 stored by the same synchronous photographing.

The profile setting processing unit 91 of the image capture apparatus 2 receives a profile image candidate by default prepared in advance or an arbitrary image photographed by a user, as a profile image.

Herein, profile image refers to an image indicating an identification function indicating which image capture apparatus 2 among the image capture apparatuses 2 performing the synchronous photographing. By way of the profile image being displayed on the image capture control apparatus 1, it is possible to intuitively distinguish where the image capture apparatus 2 displayed is arranged and what kind of role the image capture apparatus 2 has.

The wireless communication setting processing unit 92 of the image capture apparatus 2 sets a mode based on a registered main-sub relationship, and connects with the image capture control apparatus 1 or another image capture apparatus 2 via the communication unit 41.

Herein, main-sub relationship refers to a relationship indicating whether to connect directly with the image capture control apparatus 1. The main device is the image capture apparatus 2 that connects directly with the image capture control apparatus 1, and the sub devices are the image capture apparatuses 2 that receive an instruction from the image capture control apparatus 1 from the main device (via the main device) without directly connecting with the image capture control apparatus 1.

For example, the image capture control apparatus 1 transmits a setting instruction for synchronous photographing to the main-image capture apparatus 2, and then the main-image capture apparatus 2 registers the setting based on the setting instruction of the synchronous photographing and transmits the setting instruction for synchronous photographing to the sub-image capture apparatus 2. The sub-image capture apparatus 2 registers the setting based on the setting instruction for synchronous photographing received from the main-image capture apparatus 2.

In the present embodiment, a mode for setting as a main device refers to "Access Point Mode", which sets a device as an access point, and a mode for setting as a sub device refers to "Station Mode", which sets a device as a station. In other words, it is configured so that the main-capture apparatus 2 becomes an access point and the sub-image capture apparatus 2 and the image capture control apparatus 1 become stations.

It should be noted that, in the present invention, the image capture control apparatus 1 may connect with each of the image capture apparatuses 2 directly. However, since the communication traffic between the image capture control apparatus 1 and the image capture apparatuses 2 increases, it is preferable for the image capture control apparatus 1 to connect only to the main-image capture apparatus 2 among the respective image capture apparatuses 2.

Furthermore, it may be configured so that access points including another image capture apparatus 2 as well as the image capture apparatuses 2 are listed on the image capture apparatus 2 upon registering the main-sub relationship so as to select any among the image capture apparatuses 2 and another image capture apparatus 2 as main devices (access points). Furthermore, regarding the access points displayed on the image capture apparatuses 2, terminals which have no relationship with the synchronous photographing are displayed as options. However, it may be configured so that, in the wireless communication setting processing unit 71 of the image capture control apparatus 1, after starting the synchronous photographing, apparatuses that are access points which do not have a relationship with the synchronous photographing are not allowed to be displayed upon displaying the list at the image capture apparatus 2.

The photographing condition setting processing unit 93 of the image capture apparatus 2 receives a photographing condition setting from the image capture control apparatus 1 or the main-image capture apparatus 2, and registers the photographing condition setting.

The synchronous communication start processing unit 94 of the image capture apparatus 2 calculates the time difference in the time stamps upon receiving/transmitting packets by receiving/transmitting the packets between the main-image capture apparatus 2 and the sub-image capture apparatuses 2. Furthermore, the synchronous communication start processing unit 94 of the image capture apparatus 2 synchronizes a timing control unit by adjusting the time of each of the image capture apparatuses 2.

Furthermore, the synchronous communication start processing unit 94 of the image capture apparatus 2 creates a folder based on a folder creation instruction received from the image capture control apparatus 1 or the main-image capture apparatus 2.

The test shutter processing unit 95 of the image capture apparatus 2 determines a photographing condition by measuring the surrounding environment, drives the mechanism unit so as to set to be in the photographing condition thus determined, and executes a photographing sequence until just before exposure.

The live shutter processing unit 96 of the image capture apparatus 2 acquires image data through the photographing instruction for the synchronous photographing at the image capture control apparatus 1 based on the time differences in the time stamps and clock offset calculated at the synchronous communication start processing unit 74. The live shutter processing unit 76 stores the image data acquired in the folder created by the synchronous communication processing unit 94.

Operation

Figure 4:
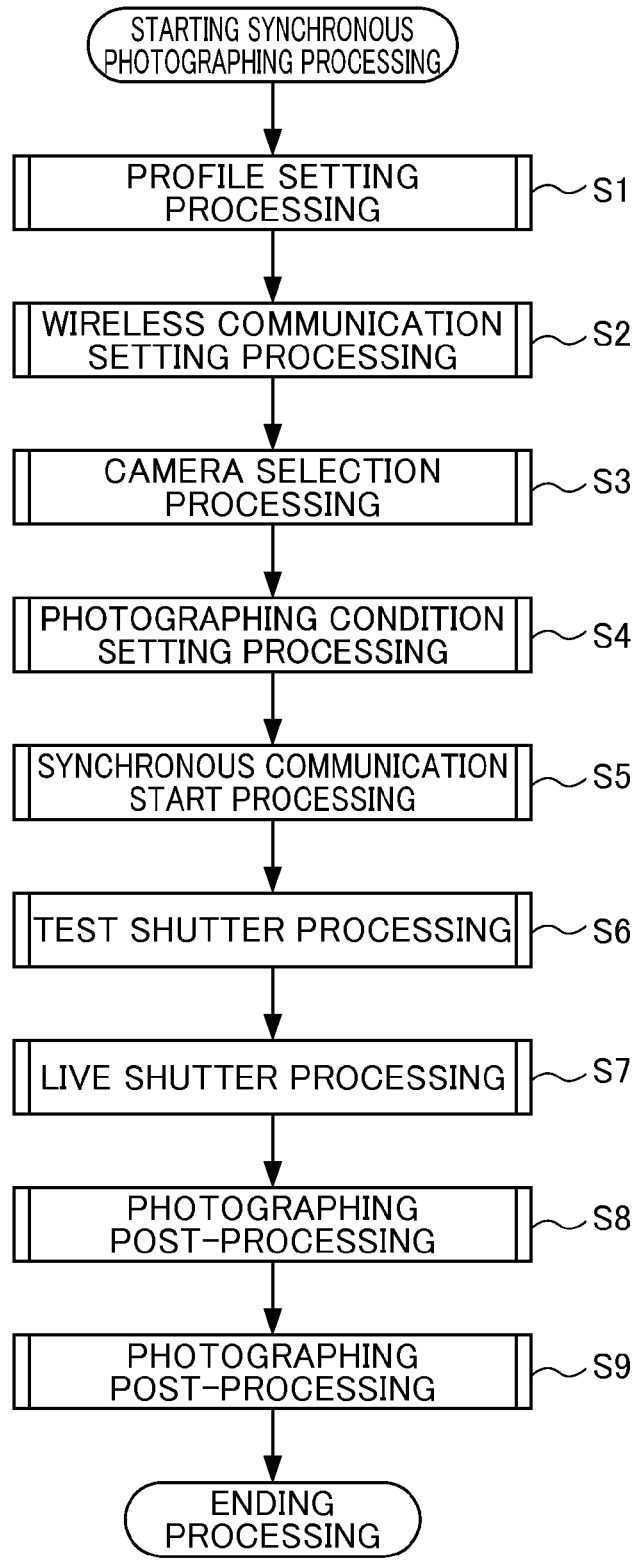
FIG. 4 is a flowchart illustrating a flow of an image capture synchronous control processing executed by the image capture control system of FIGS. 1 and 2 having the functional configuration of FIG. 3.

FIG. 4 is a flowchart illustrating the flow of the image capture synchronous control processing executed by the image capture control system 100 of FIGS. 1 and 2 having the functional configuration of FIG. 3. The image capture synchronous control processing starts by an operation of starting the image capture synchronous control processing at the input unit 18 by a user.

In Step S1, the profile setting processing unit 91 executes profile setting processing. The detailed flow of the profile setting processing is described later.

In Step S2, the wireless communication setting processing unit 71 and the wireless communication setting processing unit 92 execute wireless communication setting processing. The detailed flow of the wireless communication setting processing is described later.

In Step S3, the image capture apparatus selection processing unit 72 executes image capture apparatus selection processing. The detailed flow of the image capture apparatus selection processing is described later.

In Step S4, the photographing condition setting processing unit 73 and the photographing condition setting processing unit 93 execute photographing condition setting processing. The detailed flow of the photographing condition setting processing is described later.

In Step S5, the synchronous communication start processing unit 74 and the synchronous communication start processing unit 94 execute synchronous communication start processing. The detailed flow of the synchronous communication start processing is described later.

In Step S6, the test shutter processing unit 75 and the test shutter processing unit 95 execute test shutter processing. The detailed flow of the test shutter processing is described later.

In Step S7, the live shutter processing unit 76 and the live shutter processing unit 96 execute live shutter processing. The detailed flow of the live shutter processing is described later.

In Step S8, the photographing post-processing unit 77 executes photographing post-processing. The detailed flow of the photographing post-processing is described later.

In Step S9, the image display processing unit 78 executes image display processing. The detailed flow of the image display processing is described later. Then, the image capture synchronous control processing ends.

Figure 5:
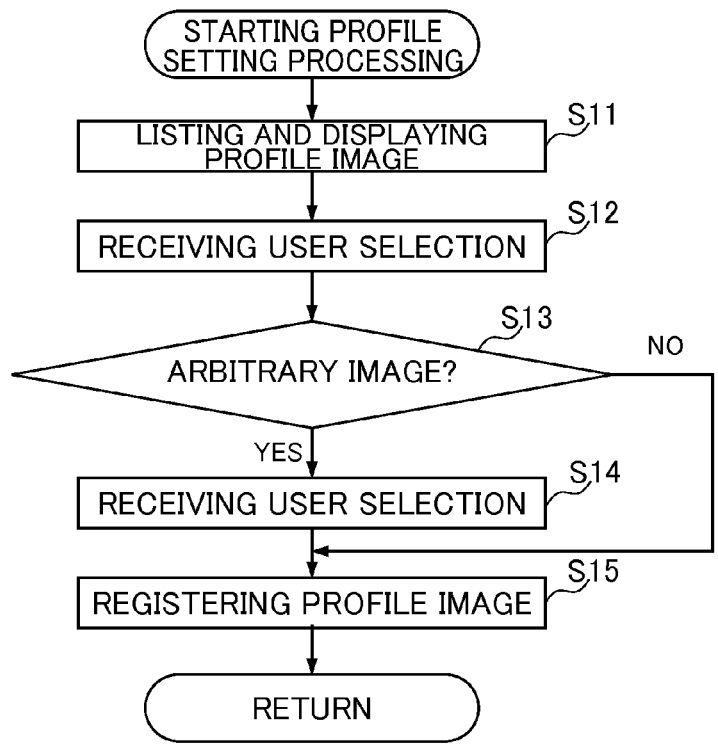
FIG. 5 is a flowchart illustrating a flow of profile setting processing by an image capture apparatus, in the flow of image capture synchronous control processing executed by the image capture control system of FIGS. 1 and 2 having the functional configuration of FIG. 3.

FIG. 5 is a flowchart illustrating a flow of the profile setting processing by the image capture apparatus 2, among the image capture synchronous control processing executed by the image capture control system 100 of FIG. 2 having the functional configuration of FIG. 3.

In Step S11, the profile setting processing unit 91 lists and displays profile image candidates for identifying image capture apparatuses by default prepared in advance and arbitrary image selection icons.

In Step S12, the profile setting processing unit 91 receives a selection of the profile image candidates or a selection of image selection icons thus listed and displayed.

In Step S13, the profile setting processing unit 91 judges whether the selection thus received is for the image selection icons.

In the case of being image selection icons, it is judged as YES in Step S13, and the processing advances to Step S14.

On the other hand, in the case of not being image selection icons, it is judged as NO in Step S13, and the processing advances to Step S15.

In Step S14, the profile setting processing unit 91 receives an arbitrary image photographed by the user (or prepared by the user).

In Step S15, the profile setting processing unit 91 stores the profile image candidate selected by the user in Step S11 or the arbitrary image received in Step S14 in the storage unit 40 as a profile image. Subsequently, the processing returns to the image capture synchronous control processing.

Figure 6:
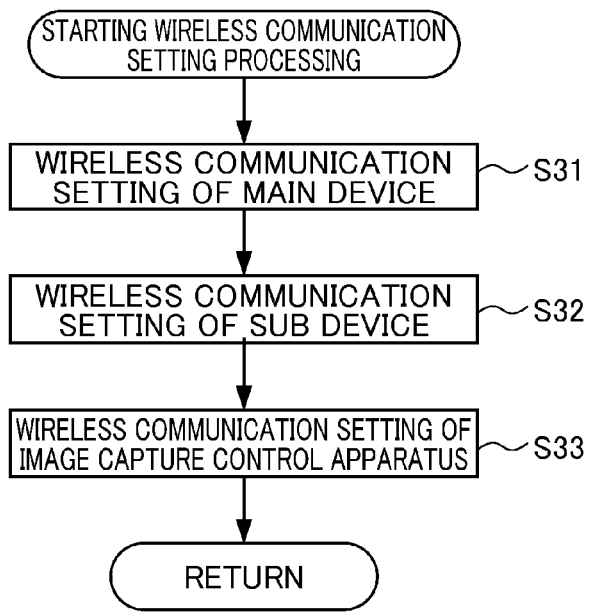
FIG. 6 is a flowchart illustrating a flow of wireless communication setting processing by an image capture control apparatus and an image capture apparatus, in the flow of image capture synchronous control processing executed by the image capture control system of FIGS. 1 and 2 having the functional configuration of FIG. 3.

FIG. 6 is a flowchart illustrating the flow of the wireless communication setting processing by the image capture control apparatus 1 and the image capture apparatus 2, among the image capture synchronous control processing executed by the image capture control system 100 of FIG. 2 having the functional configuration of FIG. 3.

In Step S31, the wireless communication setting processing unit 92 of the image capture apparatus 2, which is registered as a main device among the image capture apparatuses 2, sets Wi-Fi to the Access Point mode for activation.

In Step S32, the wireless communication setting processing unit 92 of the image capture apparatus 2, which is registered as a sub device among the image capture apparatuses 2, sets Wi-Fi to the Station mode for activation.

Figure 7A:
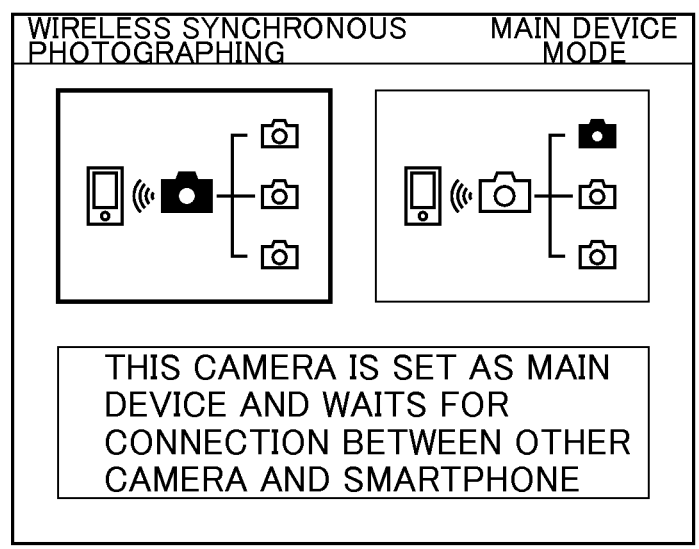
FIGS. 7A and 7B are conceptual drawings of a screen displayed after wireless communication setting processing in an image capture apparatus.
Figure 7B:
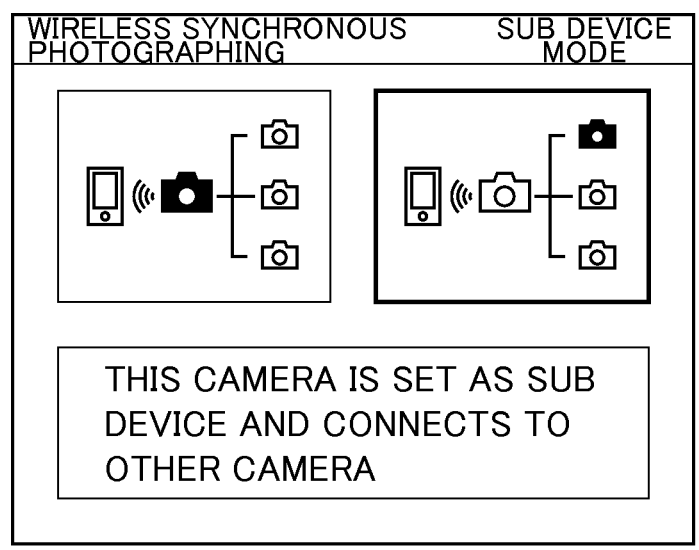

After activating the main device in Step S31 and after activating the sub device in Step S32, an image illustrated in FIG. 7 indicating in which mode each of the image capture apparatuses 2 is connected is displayed on the output unit 19. FIG. 7 is a conceptual diagram of a screen displayed after the wireless communication setting processing at the image capture apparatus 2. FIG. 7(a) is a conceptual example illustrating that the image capture apparatus 2 registered as a main device is displayed after the processing in Step S31, and displays graphics and text indicating the relationship with the image capture control apparatus 1 and the sub-image capture apparatus 2. FIG. 7(b) is a conceptual example illustrating that the image capture apparatus 2 registered as a sub device is displayed after the processing in Step S32, and displays graphics and text indicating the relationship with the image capture control apparatus 1 and the main-image capture apparatus 2.

In Step S33, the wireless communication setting processing unit 71 of the image capture control apparatus 1 sets Wi-Fi to the Station Point mode and selects the Access Point mode for activation. Subsequently, the processing returns to the image capture synchronous control processing.

Figure 8:
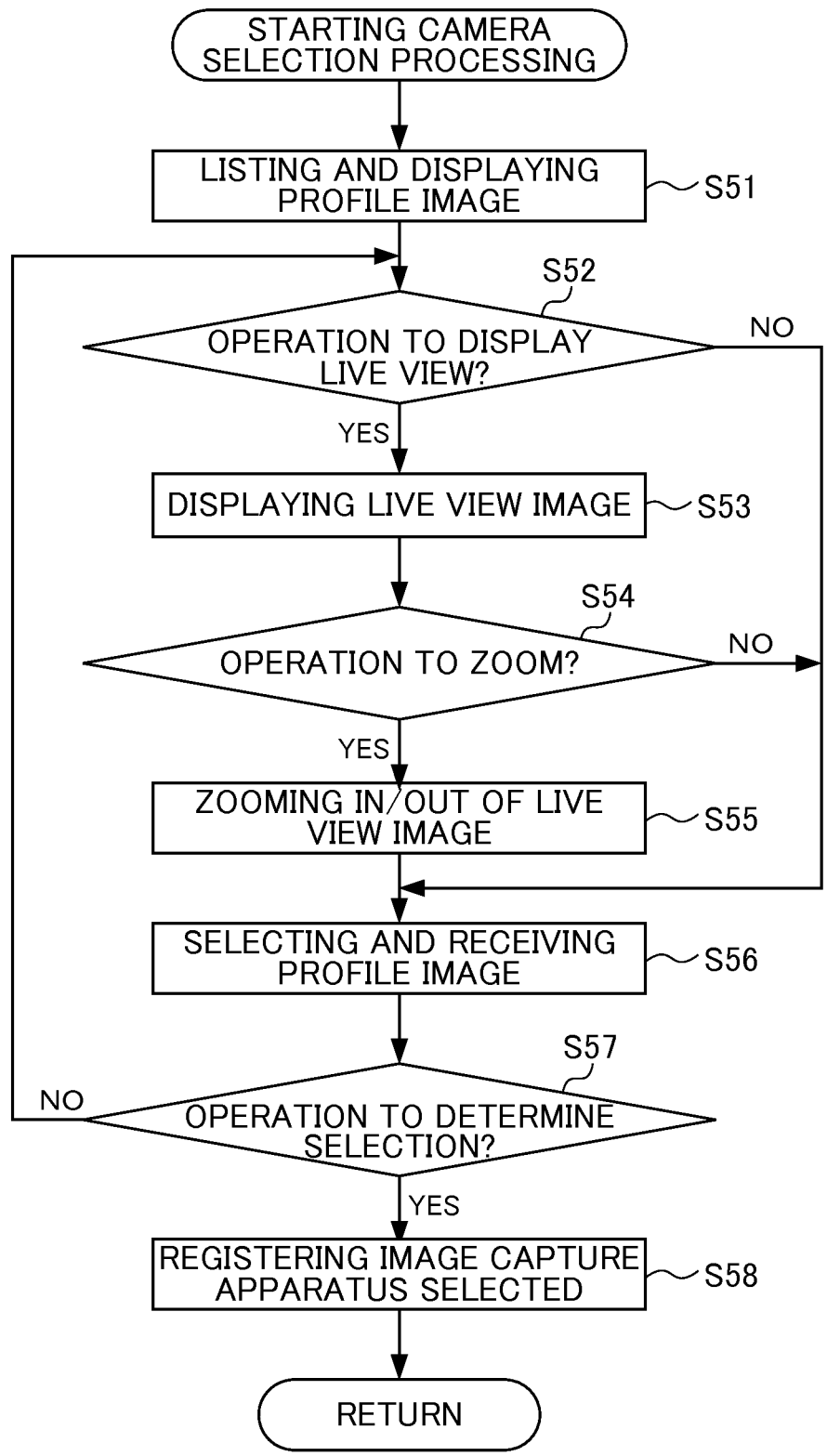
FIG. 8 is a flowchart illustrating a flow of image capture apparatus selection processing by an image capture control apparatus, in the flow of image capture synchronous control processing executed by the image capture control system of FIGS. 1 and 2 having the functional configuration of FIG. 3.

FIG. 8 is a flowchart illustrating the flow of image capture apparatus selection processing by the image capture control apparatus 1, among the image capture synchronous control processing executed by the image capture control system 100 of FIG. 2 having the functional configuration of FIG. 3.

In Step S51, the image capture apparatus selection processing unit 72 acquires information of profile images from the image capture apparatuses 2 that can participate in the synchronous photographing, among the apparatuses existing in the same network and displays as a list.

Figure 9A:
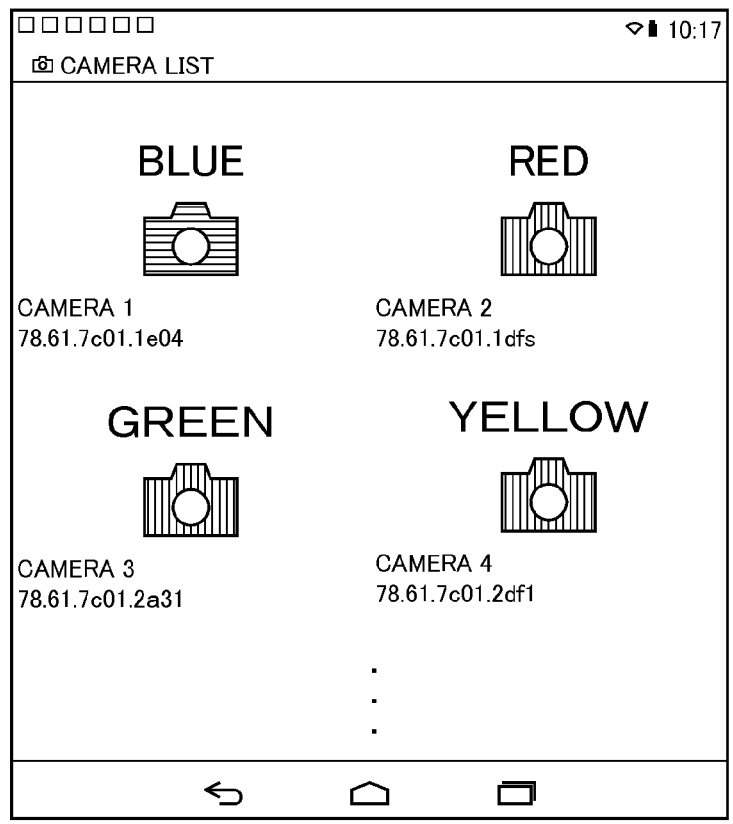
FIGS. 9A and 9B are conceptual drawings of a list display of image capture apparatuses displayed on an image capture control apparatus in the image capture apparatus selection processing.
Figure 9B:
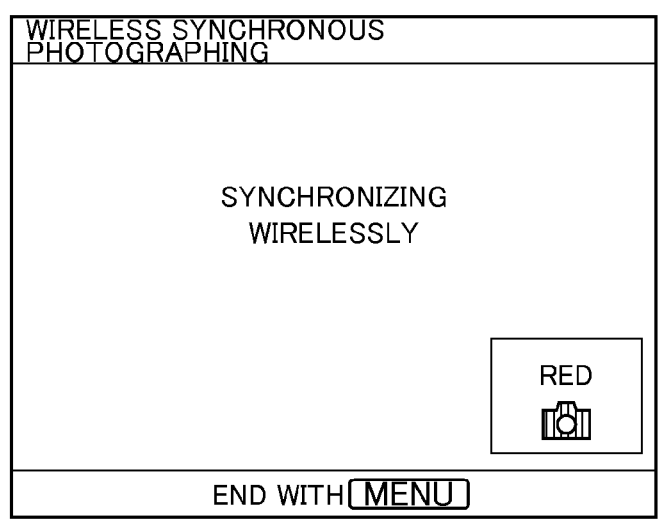

A screen example that is listed and displayed in Step S51 is illustrated in FIG. 9. FIG. 9 is a conceptual diagram of a list display in Step S51. As illustrated in FIG. 9(a), a profile image of each of the image capture apparatuses 2 is displayed in the image capture control apparatus 1 in Step S51. It should be noted that a state of being in wireless communication is displayed for each of the image capture apparatuses 2, as illustrated in FIG. 9(b).

In Step S52, the image capture apparatus selection processing unit 72 judges whether to have received an operation to display a live view image. The operation to display the live view image is an operation to select a profile image, for example.

In a case of having received the operation to display the live view image, it is judged as YES in Step S52, and the processing advances to Step S53.

On the other hand, in a case of not having received the operation to display the live view image, it is judged as NO in Step S52, and the processing advances to Step S56.

In Step S53, the image capture apparatus selection processing unit 72 acquires the live view image from the image capture apparatus 2 that corresponds to the operation to display the live view image (the operation to select the profile image), and displays the live view image in place of the profile image.

Figure 10:
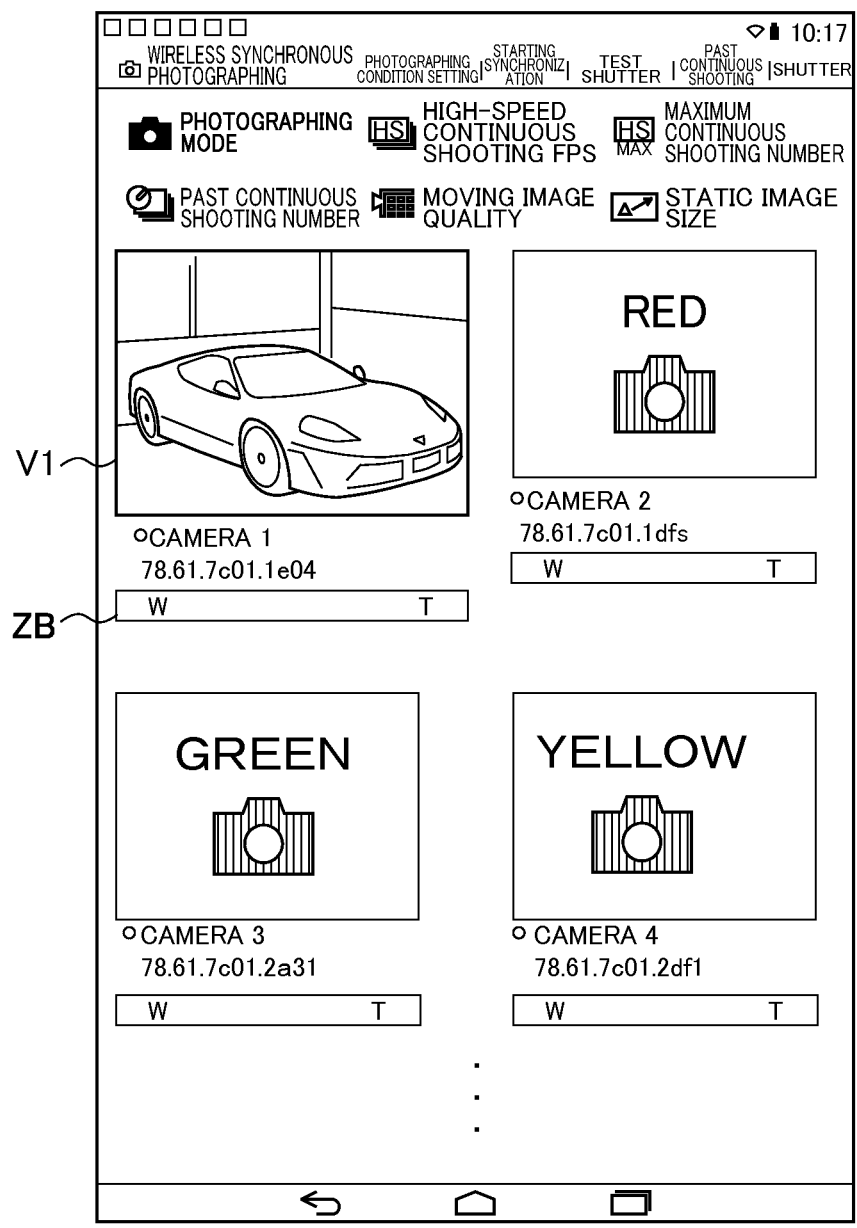
FIG. 10 is a conceptual drawing illustrating a display screen example of a live view image displayed on an image capture control apparatus in the image capture apparatus selection processing.

A screen example of a live view image displayed in Step S53 is illustrated in FIG. 10. FIG. 10 is a conceptual diagram illustrating a display screen example of a live view image in Step S53. As illustrated in FIG. 10, in Step S53, in a frame V1 displaying a profile image, a live view image is displayed in place of the profile image. It should be noted that an operation portion ZB that receives an operation to zoom in/out a live view image judged in Step S54 (described later) is provided under the frame of the profile image.

In Step S54, the image capture apparatus selection processing unit 72 judges whether to have received the operation of zooming in/out the live view image. The operation of zooming in/out the live view image is a slide operation carried out onto the operation portion ZB provided in each of the profile images, for example.

In a case of having received the operation of zooming in/out the live view, it is judged as YES in Step S54, and the processing advances to Step S55.

On the other hand, in a case of not having received the operation of zooming in/out the live view, it is judged as NO in Step S54, and the processing advances to Step S56.

In Step S56, the image capture apparatus selection processing unit 72 receives an operation of selecting a profile image of an image capture apparatus participating in the synchronous photographing.

In Step S57, the image capture apparatus selection processing unit 72 judges whether to have received the operation to determine an image capture apparatus selection.

In a case of having received the operation to determine the image capture apparatus selection, it is judged as YES in Step S57, and the processing advances to Step S58.

On the other hand, in a case of not having received the operation to determine the image capture apparatus selection, it is judged as NO in Step S57, the processing advances to Step S52, and the image capture apparatus selection processing is repeated.

In Step S58, the image capture apparatus selection processing unit 72 registers an image capture apparatus 2 corresponding to a profile image selected. Subsequently, the processing returns to the image capture synchronous control processing.

FIG. 11 is a flowchart illustrating a flow of image capture condition setting processing by the image capture control apparatus 1 and the image capture apparatus 2, among the synchronous control processing executed by the image capture control system 100 of FIG. 2 having the functional configuration of the FIG. 3.

In Step S71, the photographing condition setting processing unit 93 of a sub-image capture apparatus 2 transmits a photographing condition setting to a main-image capture apparatus 2.

In Step S72, the photographing condition setting processing unit 93 of the main-image capture apparatus 2 transmits the photographing condition setting of the sub device and the photographing condition setting of the main-image capture apparatus 2 thus received to the image capture control apparatus 1.

In Step S73, the photographing condition setting processing unit 73 of the image capture control apparatus 1 displays the photographing condition settings of each of the image capture apparatuses 2 thus received.

In Step S74, the photographing condition setting processing unit 73 of the image capture control apparatus 1 selects one image capture apparatus 2 or all of the image capture apparatuses 2 as a setting target, and receives the photographing condition setting when synchronous photographing.

Figure 12B:
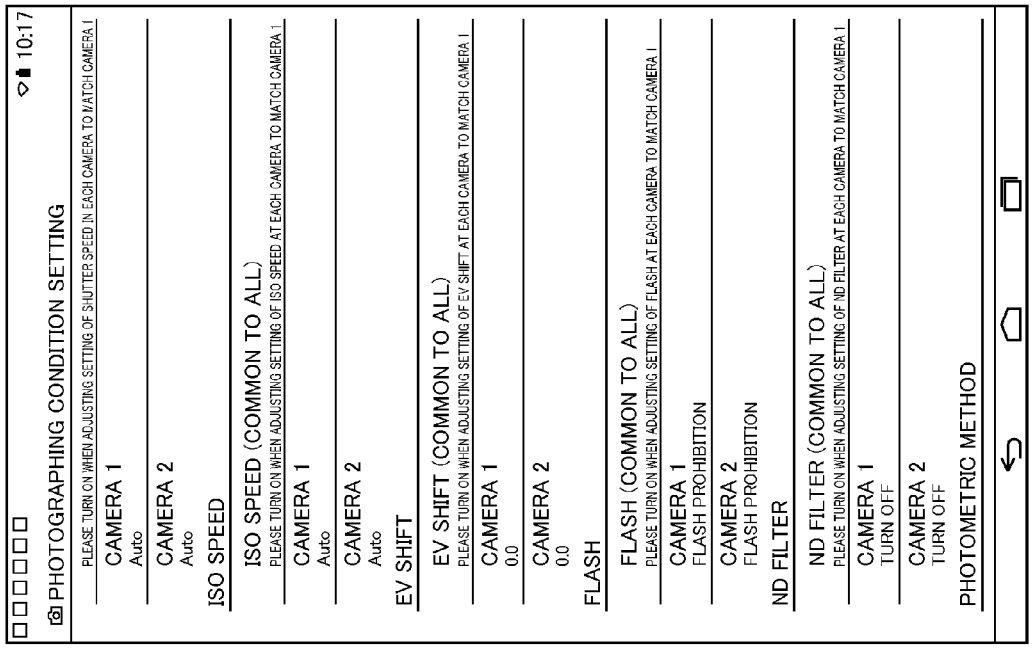
FIGS. 12A and 12B are conceptual drawings of a reception display screen example of a photographing condition setting screen in the photographing condition setting processing.
Figure 12A:
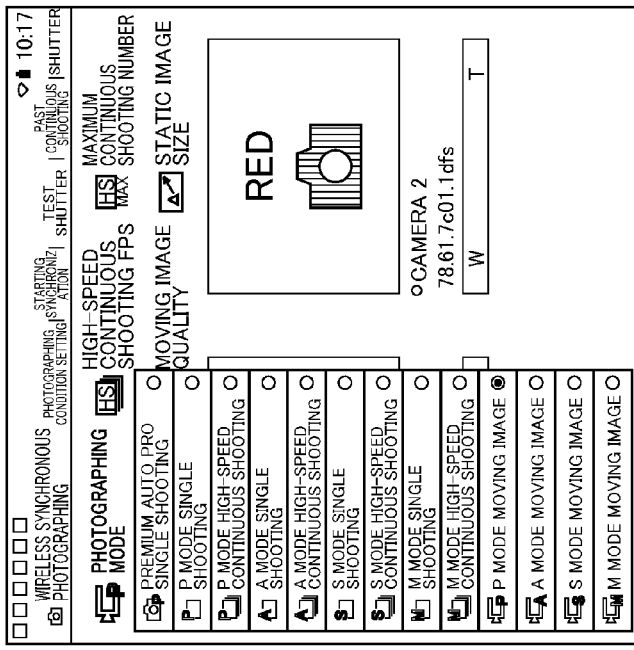

The photographing condition setting when synchronous photographing is received by way of input screens of FIG. 12, for example. FIG. 12 is a conceptual diagram of a reception screen example of a photographing condition setting in Step S74. In FIG. 12(a), a selection of a photographing mode such as single shooting, continuous shooting, moving picture, etc. is received, and in FIG. 12(b), shutter speed, ISO speed, EV shift, flash, etc. are set.

Upon performing the photographing condition setting, as illustrated in FIG. 12(b), it may be configured so that a selection unit is provided so as to adjust a photographing condition setting to that of a photographing condition setting of the image capture apparatus 2 including a main-image capture apparatus 2, etc.

In Step S75, the photographing condition setting processing unit 73 of the image capture control apparatus 1 selects a single image capture apparatus or all of the image capture apparatuses as a setting target, and transmits a photographing condition setting upon the synchronous photographing to the main-image capture apparatus 2.

In Step S76, the photographing condition setting processing unit 93 of the main-image capture apparatus 2 transmits the photographing condition setting when synchronous photographing to the image capture apparatus 2 designated.

In Step S77, the photographing condition setting processing unit 93 of the image capture apparatus 2 registers the photographing condition setting when synchronous photographing thus received. Then, the processing returns to the synchronous photographing processing.

Figure 13:
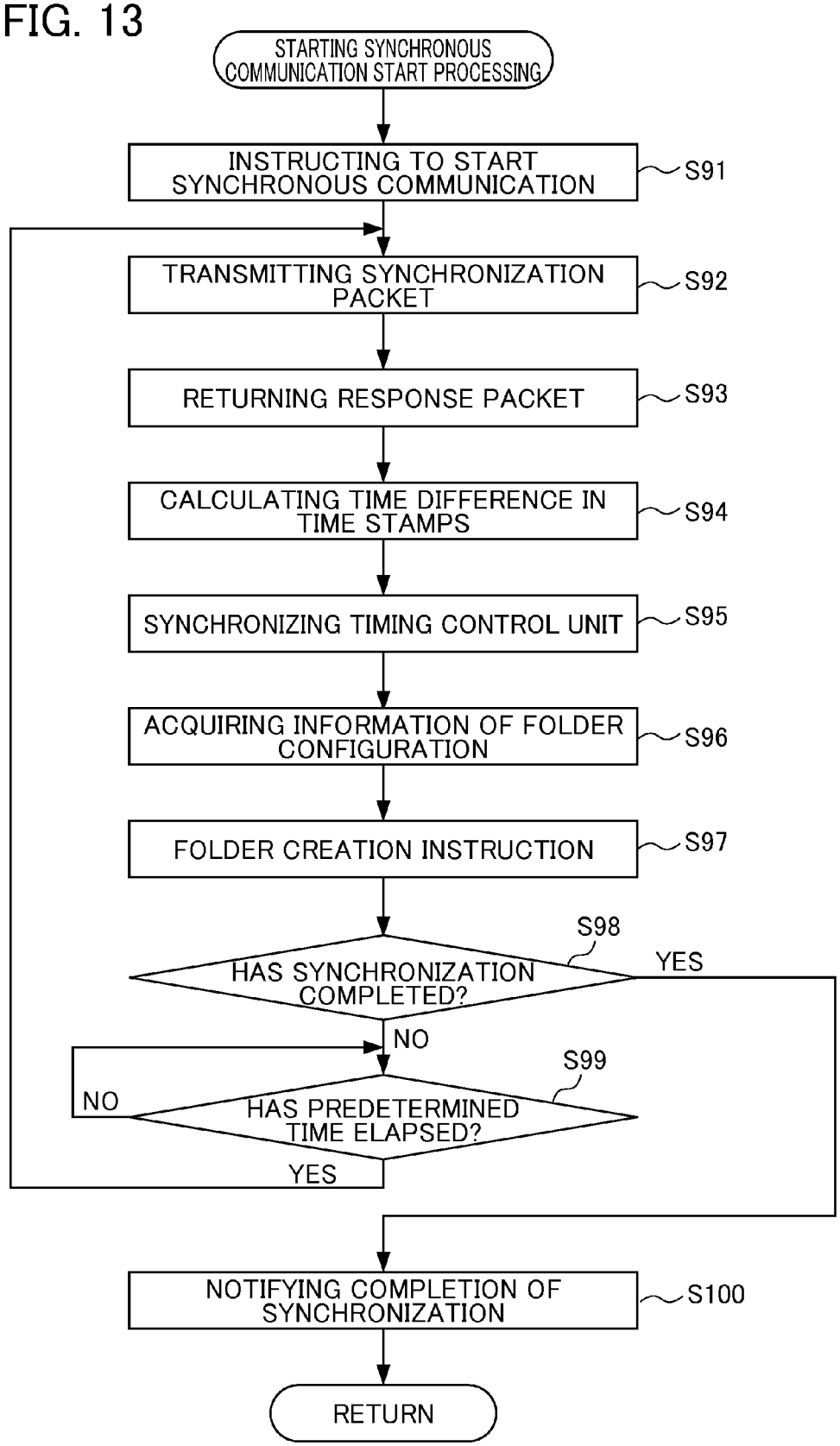
FIG. 13 is a flowchart illustrating a flow of synchronous communication start processing by an image capture control apparatus and an image capture apparatus, in the flow of image capture synchronous control processing executed by the image capture control system of FIG. 1 and FIG. 2 having the functional configuration of FIG. 3.

FIG. 13 is a flowchart illustrating the flow of synchronous communication start processing by the image capture control apparatus 1 and the image capture apparatus 2, among the image capture synchronous control processing executed by the image capture control system 100 of FIG. 2 having the functional configuration of FIG. 3.

In Step S91, the synchronous communication start processing unit 74 of the image capture control apparatus 1 transmits an instruction of synchronous communication start to a main-image capture apparatus 2.

Figure 14:
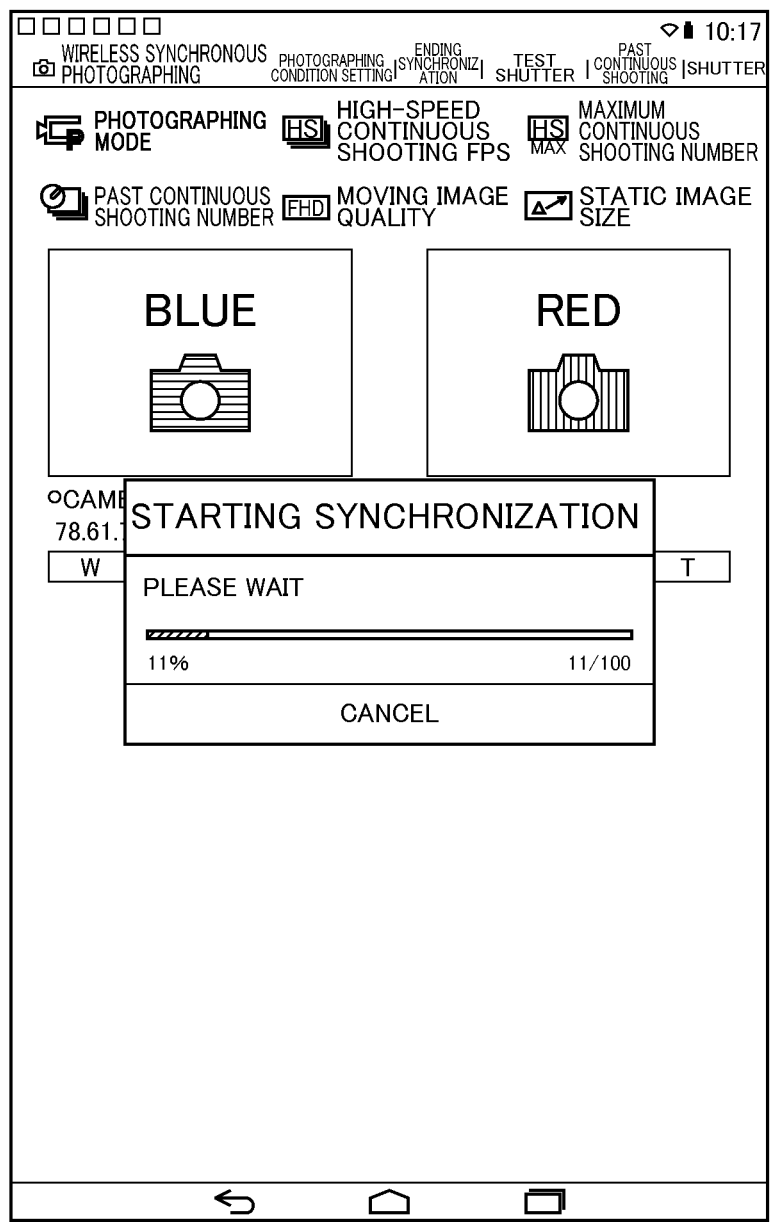
FIG. 14 is a conceptual drawing of a screen example displayed on an image capture apparatus in synchronous communication start processing.

It should be noted that it may be configured such that the synchronous communication start processing unit 74 of the image capture control apparatus 1 provides a display such as FIG. 14 indicating being in synchronous communication until a synchronization complete notification is received in Step S98. FIG. 14 is an image view of a screen displayed on the image capture control apparatus 1 from the processing of Step S91 to the processing of Step S98. As illustrated in FIG. 14, in the image capture control apparatus 1, so long as the synchronous communication is not cancelled, another operation is restricted and a screen on which an estimated time for completing synchronization is counted is displayed.

In Step S92, the synchronous communication start processing unit 94 of the main-image capture apparatus 2 transmits a synchronization packet to the sub-image capture apparatus 2.

In Step S93, the synchronous communication start processing unit 94 of the sub-image capture apparatus 2 returns a response packet to the main-image capture apparatus 2.

In Step S94, the synchronous communication start processing unit 94 of the main-image capture apparatus 2 calculates a time difference in time stamps and a clock offset during photographing based on received times of the response packets received from the sub-image capture apparatus 2.

In Step S95, the synchronous communication start processing unit 94 of the main-image capture apparatus 2 transmits an instruction to the synchronize timing control units of each of the image capture apparatuses 2 (not the time difference calculated in Step S94) to the sub-image capture apparatus 2. The sub-image capture apparatus 2 that has received an instruction to synchronize the timing control unit synchronizes the timing control unit to adjust so as to be the same time based on the instruction to synchronize the timing control unit. It should be noted that the synchronous communication start processing unit 94 of the main-image capture apparatus 2 controls the timing control unit synchronized so that an offset of the photographing timing becomes lower than a predetermined precision. For example, the synchronous communication start processing unit 94 of the main-image capture apparatus 2 adjusts to the time with precision of no more than $1/100$ seconds. When synchronizing the timing control unit so as to have the same time, it may be configured so as to synchronize the main-image capture apparatus 2 as a reference.

With such a configuration, as illustrated in FIG. 15(a), it is possible to synchronize the times in the timing control units which are offset for each image capture apparatus 2 so as to adjust to the same time as illustrated in FIG. 15(b). It should be noted that FIG. 15 is a conceptual view illustrating the principle of the present invention.

In Step S97, the synchronous communication start processing unit 74 of the image capture control apparatus 1 acquires information of a folder configuration of the storage unit 40 or the removable medium 51 of each of the image capture apparatuses 2.

In Step S98, the synchronous communication start processing unit 74 of the image capture control apparatus 1 determines a folder name which does not overlap the folder configuration thus acquired, and transmits a folder creation instruction to each of the image capture apparatuses 2 via the main-image capture apparatus 2. The synchronous communication start processing unit 94 of each of the image capture apparatuses 2 creates a folder with a folder name which is common to each of the image capture apparatuses 2 based on the folder creation instruction thus received.

It should be noted that the folder created by the synchronous communication start processing unit 74 of the image capture control apparatus 1 in the present embodiment specifies the larger numeric character among the numeric characters in the folder names of each of the image capture apparatuses 2 acquired in Step S97. Then, the synchronous communication start processing unit 74 of the image capture control unit 1 determines a folder name from a text indicating a number of which 1 is added to the larger numeric character thus specified and a fact of the folder being made by the synchronous photographing. For example, the synchronous communication start processing unit 74 of the image capture control apparatus 1 determines the folder name of "101_sync" for instruction in a case in which 100 is the larger numeric character among the numeric characters in the folder names of each of the image capture apparatuses.

It should also be noted that it may be configured so as to instruct a folder name created by connecting a character sequence portion common to the synchronous photographing (number portion) with a character sequence portion identifying each image capture apparatus such as "101_sync_CameraA" and "101_sync_CameraB", as well as instructing a folder name common to all of the image capture apparatuses.

Similarly for the file name, it may be configured so as to instruct a file name created by connecting a character sequence portion common to the synchronous photographing (number portion) with a character sequence portion identifying each image capture apparatus as well as instructing a file name common to all of the image capture apparatuses.

In Step S98, the synchronous communication start processing unit 94 of the main-image capture apparatus 2 judges whether the synchronization has completed.

In a case of the synchronization having completed, it is judged as YES in Step S98, and the processing advances to Step S100.

In a case of the synchronization not having completed, it is judged as NO in Step S98, and the processing advances to Step S99.

In Step S99, the synchronous communication start processing unit 94 of the main-image capture apparatus 2 judges whether a predetermined time has elapsed.

In a case in which a predetermined time has elapsed, it is judged as YES in Step S99, and the processing returns to Step S92.

In a case in which a predetermined time has not elapsed, it is judged as NO in Step S99, and the processing returns to Step S99.

In Step S100, the synchronous communication start processing unit 94 of the main device notifies of completion of synchronization to the image capture control apparatus 1. Then, the processing returns to the image capture synchronous control processing.

Figure 16:
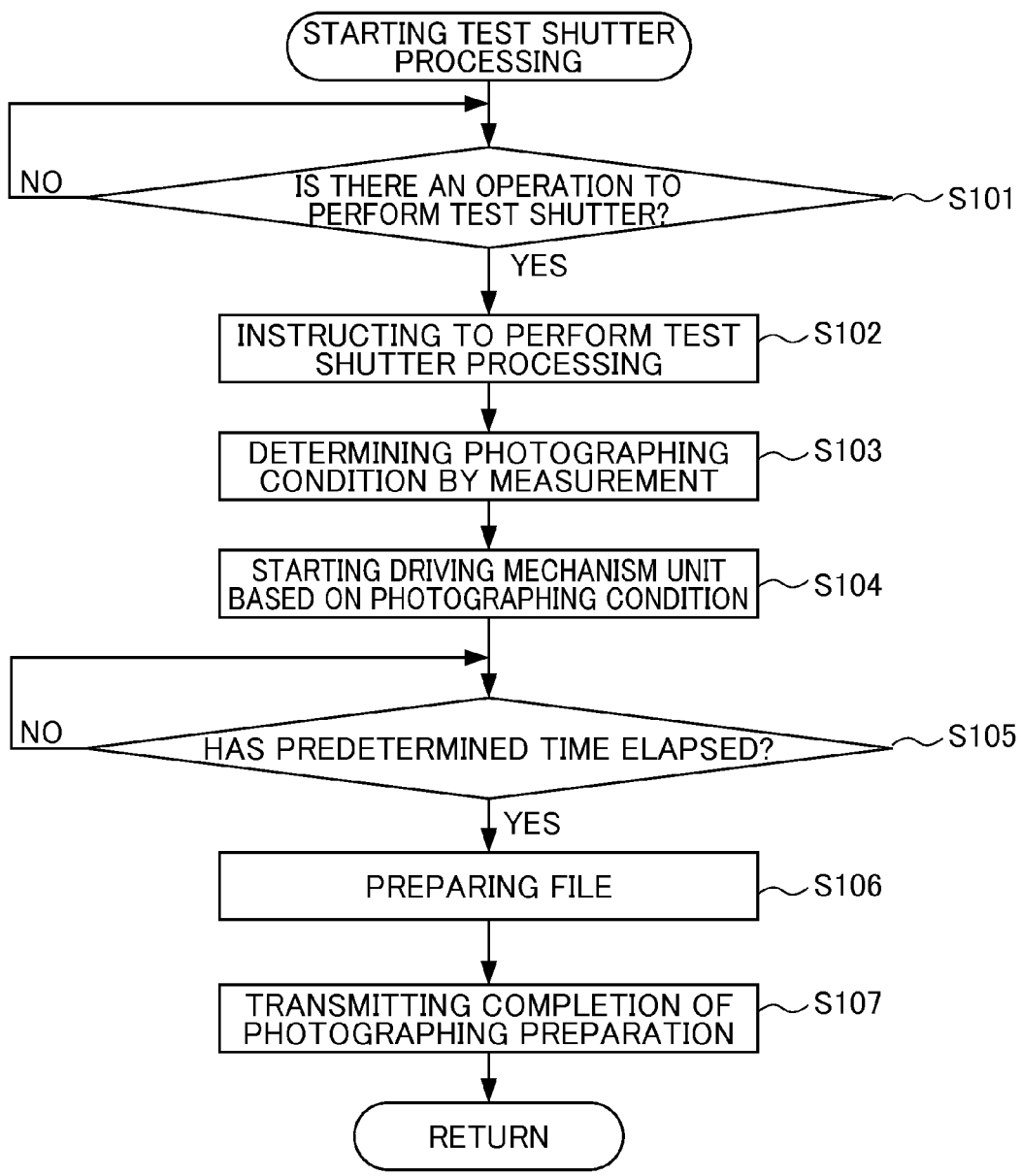
FIG. 16 is a flowchart illustrating a flow of test shutter processing by an image capture control apparatus and an image capture apparatus, in the flow of image capture synchronous control processing executed by the image capture control system of FIGS. 1 and 2 having the functional configuration of FIG. 3.

FIG. 16 is a flowchart illustrating the flow of test shutter processing by the image capture control apparatus 1 and the image capture apparatus 2, among the image capture synchronous control processing executed by the image capture control system 100 of FIG. 2 having the functional configuration of FIG. 3.

In Step S101, the test shutter processing unit 75 of the image capture control apparatus 1 judges whether a test shutter operation has been performed.

In a case in which the test shutter operation has been performed, it is judged as YES in Step S101, and the processing advances to Step S102.

In a case in which the test shutter operation has not been performed, it is judged as NO in Step S101, and the processing returns to Step S101.

In Step S102, the test shutter processing unit 75 of the image capture control apparatus 1 instructs the main-image capture apparatus 2 and the sub-image capture apparatus 2 via the main-image capture apparatus 2 to perform the test shutter processing.

In Step S103, the test shutter processing unit 95 of the image capture apparatus 2 determines a photographing condition setting by measuring the surrounding environment such as a state of a subject, etc. More specifically, the test shutter processing unit 95 measures the surrounding environment by way of the sensor unit 37, and determines setting values for photographing condition settings such as the AF function, AE function, the AWB, etc. influenced by the surrounding environment such as the state of a subject.

In Step S104, the test shutter processing unit 95 of the image capture apparatus 2 drives a mechanism unit so as to set to be in the photographing condition setting determined in Step S103. More specifically, the test shutter processing unit 95 performs operation of a lens and driving of a sensor based on set values determined in Step S103.

In this way, by performing the processing in Step S104, it is possible to reduce, in the live shutter processing, the time difference until the time of photographing due to the differences caused upon operating different lenses and driving a mechanism unit such as driving a sensor, for each of the image capture apparatuses 2 and the surrounding environment.

In Step S105, the test shutter processing unit 95 of the main-image capture apparatus 2 judges whether a predetermined time has elapsed.

In a case in which a predetermined time has not elapsed, it is judged as NO in Step S105, and the processing enters a standby state.

In a case in which a predetermined time has elapsed, it is judged as YES in Step S105, and the processing advances to Step S106.

In Step S106, the test shutter processing unit 95 of each of the image capture apparatuses 2 creates a file that is necessary when photographing a moving image, and opens the file to prepare photographing.

In Step S107, the test shutter processing unit 95 of the sub-image capture apparatus 2 transmits a notification of completing photographing preparation to the main-image capture apparatus 2. Then, the processing returns to the image capture synchronous control processing.

In this way, as illustrated in FIG. 15(c), by adjusting in advance the difference occurring in each of the image capture apparatus 2 from the time of the test shutter until the timing capable of photographing, it is possible not to cause the difference in photographing occurring due to driving a mechanism unit, opening a file, or the like in the live shutter processing described later.

Figure 17:
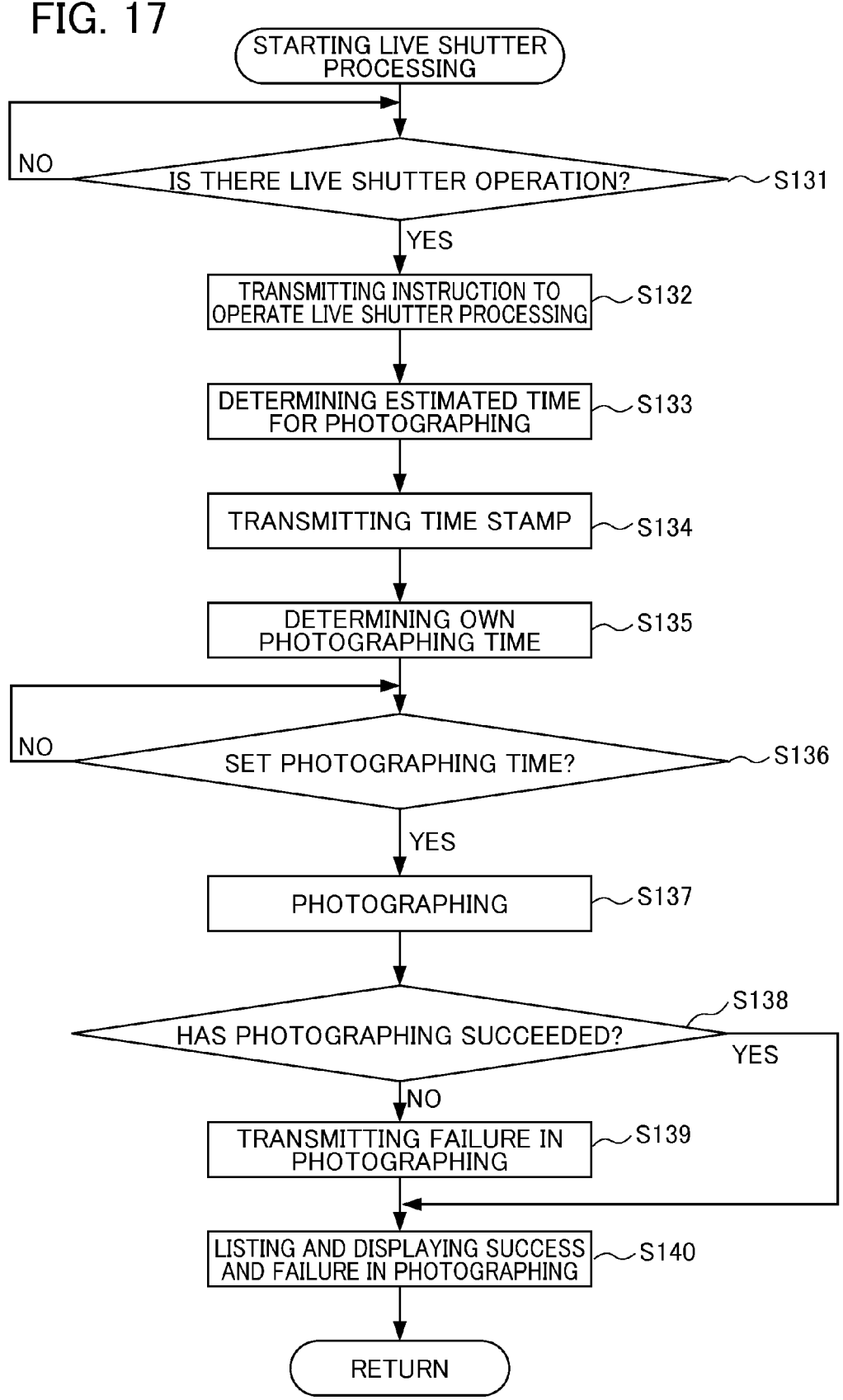
FIG. 17 is a flowchart illustrating a flow of live shutter processing by an image capture control apparatus and an image capture apparatus, in the flow of image capture synchronous control processing executed by the image capture control system of FIGS. 1 and 2 having the functional configuration of FIG. 3.

FIG. 17 is a flowchart illustrating the flow of live shutter processing by the image capture control apparatus 1 and the image capture apparatus 2, among the image capture synchronous control processing executed by the image capture control system 100 of FIG. 2 having the functional configuration of FIG. 3.

In Step S131, the shutter processing unit 76 of the image capture control apparatus 1 judges whether the live shutter operation has been received.

In a case in which the live shutter operation has not been received, it is judged as NO in Step S131, and the processing enters the standby state.

In a case in which the live shutter operation has been received, it is judged as YES in Step S131, and the processing advances to Step S132.

In Step S132, the live shutter processing unit 76 of the image capture control apparatus 1 transmits an instruction of performing the live shutter processing to the main-image capture apparatus 2.

In Step S133, the live shutter processing unit 96 of the main-image capture apparatus 2 determines an estimated time of photographing based on time differences in the time stamps determined in Step S94 of the synchronous communication start processing.

In Step S134, the live shutter processing unit 96 of the main-image capture apparatus 2 transmits a time stamp of the estimated time for photographing.

In Step S135, the live shutter processing unit 96 of the sub-image capture apparatus 2 adds its own time difference to the time stamp of the estimated time for photographing received to determine its own time for photographing.

In Step S136, the live shutter processing unit 96 of each of the image capture apparatuses 2 judges whether being the own time for photographing.

In a case of not being the own time for photographing, it is judged as NO in Step S136, and the processing returns to Step S136.

In a case of being the own time for photographing, it is judged as YES in Step S136, and the processing advances to Step S137.

In Step S137, the live shutter processing unit 96 of each of the image capture apparatuses 2 perform photographing to acquire image data, and stores the image data in the folder created in Step S97 of the synchronous communication start processing.

It should be noted that, in a case of the photographing mode being moving image photographing, the live shutter processing unit 96 of the main-image capture apparatus 2 transmits a clock correction instruction to the sub-image capture apparatus 2 so as to adjust to match an image capture apparatus 2 which performs the latest operation (an interval of a clock period is large), based on the clock offset calculated in Step S94 of the synchronous communication start processing each time a predetermined time has lapsed. The sub-image capture apparatus 2 delays a photographing time based on the clock correction instruction thus received. In this way, it is possible to reduce difference in synchronization occurring during moving image photographing by correcting a clock offset, which may differ according to the precision of a quartz oscillator embedded in the image capture apparatus 2. In other words, since synchronization maintenance operation that corrects the clock offset is performed, a synchronous state of the timing control unit maintains.

It should be noted that, regarding the image data thus stored, its file name may be named similarly to the folder name and, in a case in which a plurality of files is created in a single synchronous photographing such as continuous photography (synchronous photographing performed sequentially in a state of a communication connection for synchronous photographing being established), the files are stored in the same folder and identification information is given which indicates a photographing sequence to set the files in a photographed order so that the files can be distinguished in the same folder, and the same name with the other image capture apparatuses 2 is given so as to clarify that the files were photographed at the same time in the other image capture apparatuses 2. For example, a name created by adding a numeric character incremented every time photographing to the folder name may be used as the file name. Furthermore, time information may be added to the file (image data), and it may be configured so that the difference in photographing timing is made less than a predetermined precision based on the files photographed at the same time, which are specified by the file name and the time information added to the file.

In Step S138, the live shutter processing unit 96 of each of the image capture apparatuses 2 judges whether photographing has succeeded.

In a case in which the photographing has not succeeded, it is judged as NO in Step S138, and the processing advances to Step S139.

In a case in which the photographing has succeeded, it is judged as YES in Step S138, and the processing advances to Step S140.

In Step S139, the live shutter processing unit 96 of each of the image capture apparatuses 2 notifies the image capture control apparatus 1 of failure in photographing.

In Step S140, the live shutter processing unit 96 of the image capture control apparatus 1 lists and displays whether photographing has succeeded or failed. Then, the processing returns to the image capture synchronous control processing.

As mentioned above, in the live shutter processing, as illustrated in FIG. 15(d), since the own photographing time can be determined based on the time difference in time stamps, it is possible to perform synchronization and photographing regardless of a time difference accompanying propagation delay in communication.

In FIG. 15(d), the photographing sequence such as driving the mechanism unit, opening a file, etc., performed until photographing has already completed in the test shutter processing; therefore, it is possible to perform the synchronous photographing at a timing earlier than "8". However, in the present embodiment, it is configured so as to perform photographing at the timing of "8" at which the latest photographing sequence completes in a case of performing the photographing sequence.

Figure 18:
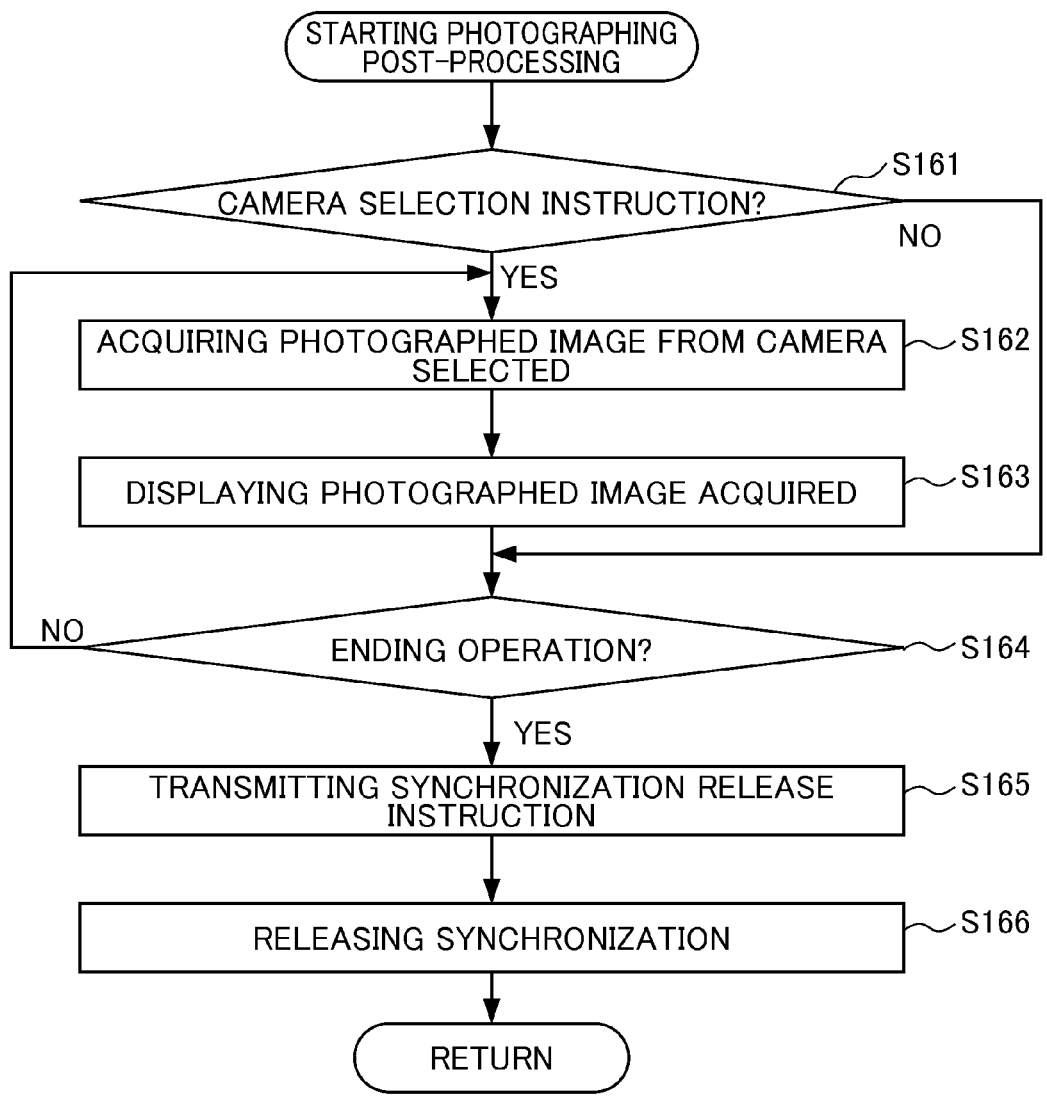
FIG. 18 is a flowchart illustrating a flow of photographing post-processing by an image capture control apparatus and an image capture apparatus, in the flow of image capture synchronous control processing executed by the image capture control system of FIGS. 1 and 2 having the functional configuration of FIG. 3.

FIG. 18 is a flowchart illustrating the flow of photographing post-processing by the image capture control apparatus 1 and the image capture apparatus 2, among the image capture synchronous control processing executed by the image capture control system 100 of FIG. 2 having the functional configuration of FIG. 3.

In Step S161, the photographing post-processing unit 77 of the image capture control apparatus 1 judges whether a selection of the image capture apparatus 2 has been instructed.

In a case in which the selection of the image capture apparatus 2 has not been instructed, it is judged as NO in Step S161, and the processing advances to Step S164. The processing after Step S164 is described later.

In a case in which the selection of the image capture apparatus 2 has been instructed, it is judged as YES in Step S161, and the processing advances to Step S162.

In Step S162, the photographing post-processing unit 77 of the image capture control apparatus 1 acquires image data from the image capture apparatus 2 thus selected.

In Step S163, the photographing post-processing unit 77 of the image capture control apparatus 1 displays an image based on the image data thus acquired.

In Step S164, the photographing post-processing unit 77 of the image capture control apparatus 1 judges whether an end operation by a user has been received.

In a case in which the end operation by the user has not been received, it is judged as NO in Step S164, and the processing returns to Step S161.

In a case in which the end operation by the user has been received, it is judged as YES in Step S164, and the processing advances to Step S165.

In Step S165, the photographing post-processing unit 77 of the image capture control apparatus 1 transmits a synchronization release instruction.

In Step S166, the synchronous communication start processing unit 74 of each of the image capture apparatuses 2 releases the synchronization. Subsequently, the processing returns to the image capture synchronous control processing.

Figure 19:
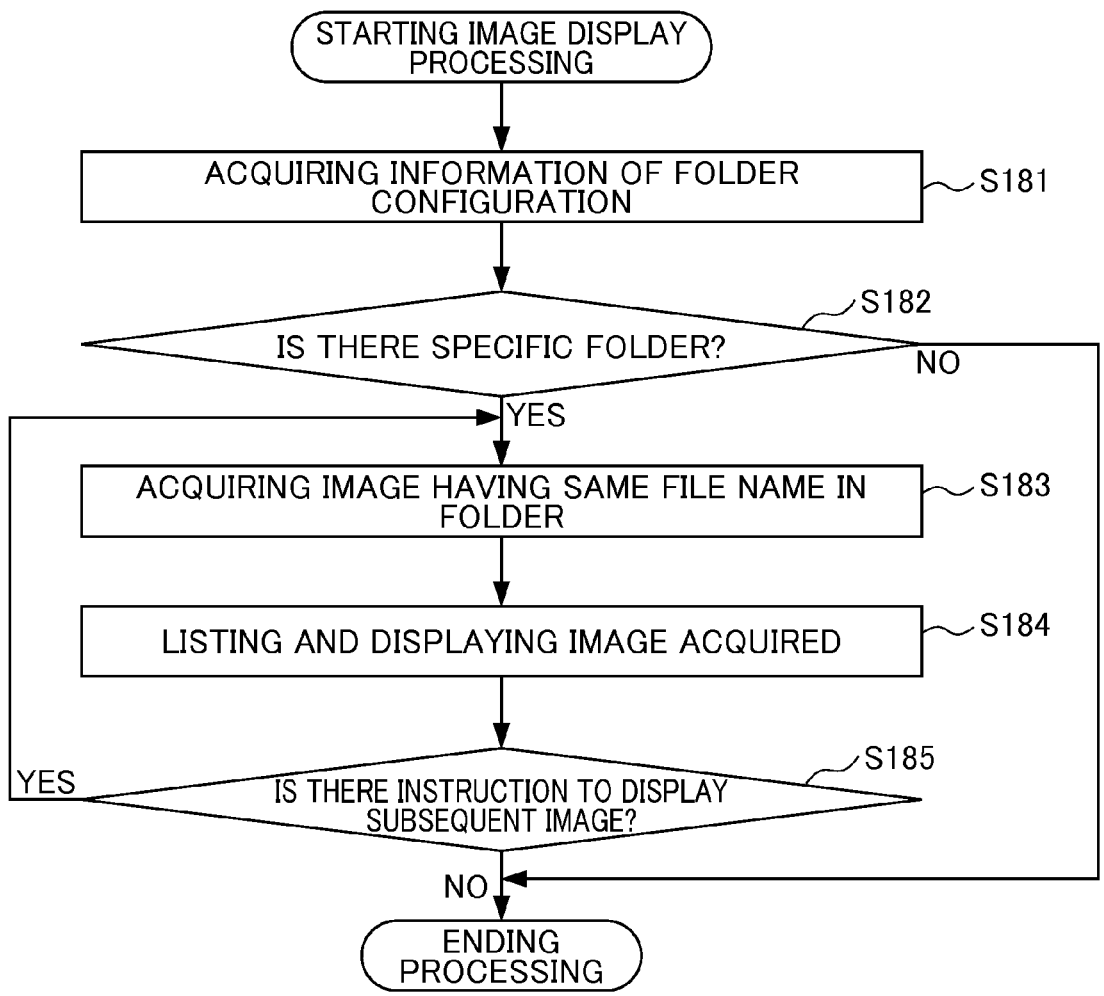
FIG. 19 is a flowchart illustrating a flow of image display processing by an image capture control apparatus and an image capture apparatus, in the flow of image capture synchronous control processing executed by the image capture control system of FIGS. 1 and 2 having the functional configuration of FIG. 3.

FIG. 19 is a flowchart illustrating the flow of image display processing by the image capture control apparatus 1 and the image capture apparatus 2, among the image capture synchronous control processing executed by the image capture control system 100 of FIG. 2 having the functional configuration of FIG. 3.

In Step S181, the image display processing unit 78 of the image capture control apparatus 1 acquires information of a folder configuration of the storage unit 40 or the removable medium 51 of each of the image capture apparatuses 2.

In Step S182, the image display processing unit 78 of the image capture control apparatus 1 judges whether there is a specific folder.

In a case in which there is not a specific folder, it is judged as NO in Step S182, and the processing returns to the image capture synchronous control processing.

In a case in which there is a specific folder, it is judged as YES in Step S182, and the processing advances to Step S183.

In Step S183, the image display processing unit 78 of the image capture control apparatus 1 acquires an image having the same file name in the folder.

In Step S184, the image display processing unit 78 of the image capture control apparatus 1 lists and displays the image thus acquired.

In Step S185, the image display processing unit 78 of the image capture control apparatus 1 judges whether there is an instruction to display a subsequent image.

In a case in which there is an instruction to display a subsequent image, it is judged as YES in Step S185, and the processing returns to Step S183.

In a case in which there is not an instruction to display a subsequent image, it is judged as NO in Step S185, and the processing returns to the image capture synchronous control processing.

The image capture control system 100 configured as described above includes the image capture control apparatus 1 and a plurality of the image capture apparatuses 2.

Among the plurality of image capture apparatuses 2, one of the plurality of the image capture apparatuses 2 participating in synchronous photographing is set as the main-image capture apparatus 2, and the other image capture apparatuses 2 are set as the sub-image capture apparatuses 2, and the main-image capture apparatus 2 performs control to perform synchronization of a photographing timing among the plurality of the image capture apparatuses 2 participating in synchronous photographing.

The image capture control apparatus 1 performs control to instruct the plurality of the image capture apparatuses 2 to perform the instruction contents from a user.

With such a configuration, it is sufficient so long as the user simply performs setting of the synchronous photographing around the main-image capture apparatus 2, and thus, in a case of performing the synchronous photographing with a plurality of image capture apparatuses, it is possible to perform setting of the synchronous photographing easier.

Furthermore, regarding the image capture control system 100, in a case of performing wireless communication between any apparatuses including the image capture control apparatus 1 and the plurality of the image capture apparatuses 2, one of the plurality of the image capture apparatuses 2 participating in synchronous photographing is set as an access point for wireless communication and other image capture apparatuses 2 other than the image capture apparatus 2 that was set as the access point for this wireless communication and the image capture control apparatus 1 are set as stations for wireless communication.

With such a configuration, each of the image capture apparatuses 2 does not perform communication with the image capture control apparatus 1, respectively, and thus the communication is performed via the image capture apparatus 2 which is set as an access point, a result of which propagation delay is not likely to be caused and the necessity to take into account communication situations at each of the apparatuses for the user decreases. Therefore, it is possible to perform the setting of the synchronous photographing easier in a case of performing the synchronous photographing with the plurality of image capture apparatuses.

Furthermore, regarding the image capture control system 100, the main-image capture apparatus 2 is set as an access point, and the image capture control apparatus 1 and the sub-image capture apparatus 2 are set as stations.

With such a configuration, since the access point as a base for communication is identical to the main device as the center for the setting, the user does not take into account a complicated setting, and thus it is possible for the user to perform the setting of the synchronous photographing easier in a case of performing the synchronous photographing with the plurality of image capture apparatuses.

Furthermore, the image capture control apparatus 1 includes the output unit 19.

The output unit 19 performs a screen display.

The image capture control apparatus 1 lists and displays identification information of each of the image capture apparatuses 2 corresponding to each of the plurality of the image capture apparatuses 2 capable of synchronous photographing on a screen display of the output unit 19 and selects image capture apparatuses to participate in synchronous photographing.

With such a configuration, it is possible to grasp easily the image capture apparatuses 2 capable of the synchronous photographing in the image capture control apparatus 1, and once the user sees the image capture control apparatus 1, it is possible to grasp the image capture apparatuses 2 capable of the synchronous photographing, and it is possible to perform setting of the synchronous photographing easier in a case of performing the synchronous photographing with a plurality of image capture apparatuses.

Furthermore, the image capture control apparatus 1 identifies and displays the main-image capture apparatus 2 and the sub-image capture apparatus 2 on a screen display at the output unit 19.

With such a configuration, it is possible to grasp intuitively the main-image capture apparatus 2 and the sub-image capture apparatus 2 as the center for setting, and it is possible to perform setting of the synchronous photographing easier in a case of performing the synchronous photographing with a plurality of image capture apparatuses.

Furthermore, the image capture control apparatus 1 selects a profile image that is identification information for each of the plurality of the image capture apparatuses 2 from among a predetermined plurality of profile images, or displays the profile image in a selectable manner from among registered profile images created from photographed images arbitrarily selected, on the screen display at the display unit 19.

With such a configuration, it is possible to intuitively grasp arrangements, functions, etc. of each of the image capture apparatuses 2 once looking at the profile image displayed on a screen, and thus it is possible to perform setting of the synchronous photographing easier in a case of performing the synchronous photographing with a plurality of image capture apparatuses.

Furthermore, the image capture control apparatus 1 receives a live view image of the image capture apparatus 2 corresponding to a profile image selected according to a selection from of a profile image listed and displayed on the screen display of the output unit 19, and displays the live view image of the image capture apparatus 2 in place of a corresponding profile image.

With such a configuration, since it is possible to review an actual photographed screen by the live view when the user feel necessary upon the user grasping arrangements, functions, etc. grasped via the profile image, it is not likely to become difficult to understand intuitively by reviewing in detail the live view in which a plurality of live views are displayed. Therefore, it is possible to perform setting of the synchronous photographing easier in a case of performing the synchronous photographing with a plurality of image capture apparatuses.

Furthermore, the image capture apparatus 2 further includes the photographing condition setting processing unit 93.

The photographing condition setting processing unit 93 sets a photographing condition in each of the image capture apparatus 2 or collectively in all of the image capture apparatuses 2 participating in synchronous photographing, by an instruction from the image capture control apparatus 1.

With such a configuration, it is unnecessary for the user to set by directly operate each of the image capture apparatuses 2, and it is possible to easily compare other image capture apparatuses 2 by operating the image capture control apparatus 1, and it is possible to perform setting of the synchronous photographing easier in a case of performing the synchronous photographing with a plurality of image capture apparatuses.

Furthermore, the photographing condition setting processing unit 93 selects whether to adjust a photographing condition of the sub-image capture apparatus 2 to a photographing condition of the main-image capture apparatus 2 with an instruction from the image capture control apparatus 1 or to set a photographing condition designated by a user by an operation of the image capture control apparatus 1 in a plurality of the image capture apparatuses 2.

With such a configuration, it is unnecessary for the user to set the setting common to the plurality of the image capture apparatuses 2 for each of the image capture apparatuses 2, and it is possible to perform setting of the synchronous photographing in a case of performing the synchronous photographing with a plurality of image capture apparatuses 2.

Furthermore, the image capture control system 100 includes an image capture control apparatus 1 that performs a photographing operation; and a plurality of image capture apparatuses 2 that performs synchronous photographing in response to an instruction from the image capture control apparatus 1.

Regarding the image capture control system 100, in a case of performing wireless communication between any apparatuses including the image capture control apparatus 1 and the plurality of the image capture apparatuses 2 in response to an instruction from the image capture control apparatus 1, one of the plurality of the image capture apparatuses participating in synchronous photographing is set as an access point for wireless communication and other image capture apparatuses 2 other than the image capture apparatus 2 which was set as an access point for the wireless communication and the image capture control apparatus 1 are set as stations for the wireless communication.

With such a configuration, the main-image capture apparatus 2 is set as an access point and the sub-image capture apparatus 2 and the image capture control apparatus 1 are set as stations. Therefore, each of the image capture apparatuses 2 do not perform communication with the image capture control apparatus 1, respectively, and thus the communication is performed via the main-image capture apparatus 2, a result of which propagation delay is not likely to be caused and the necessity to take into account communication situations at each of the apparatuses for the user decreases. Therefore, it is possible to perform the setting of the synchronous photographing easier in a case of performing the synchronous photographing with the plurality of image capture apparatuses.

Furthermore, regarding the image capture control system 100, the image capture apparatus selection processing unit 72 of the image capture control apparatus 1 performs a screen display.

Each of the image capture apparatuses 2 has an access point selection function that lists and displays connectable access points for selection when connecting to wireless LAN.

In a case in which a synchronous photographing mode is selected on a screen display at the image capture apparatus selection processing unit 72, after initially setting the image capture apparatus 2 to be as an access point, when the image capture apparatus 2 which is set as a station selects an access point, the image capture control apparatus 1 is configured so as not to display as an option an access point that is an apparatus unrelated to synchronous photographing.

With such a configuration, upon selecting an access point, since apparatuses which do not have a relationship with the synchronous photographing, the user no longer selects an access point which cannot perform the synchronous photographing when performing the synchronous photographing. Therefore, it is possible to perform setting of the synchronous photographing easier in a case of performing the synchronous photographing with a plurality of image capture apparatuses.

Regarding the image capture 100, any of the plurality of the image capture apparatuses 2 also serves a function of the image capture control apparatus 1.

With such a configuration, it is possible to perform the synchronous photographing without preparing another image capture control apparatus 1 other than the image capture apparatus 2, and it is possible to perform setting of the synchronous photographing easier in a case of performing the synchronous photographing with a plurality of image capture apparatuses.

Furthermore, the image capture control apparatus 1 includes the output unit 19 and the communication unit 21. The image capture control apparatus 1 includes the image capture apparatus selection processing unit 72 and the live shutter processing unit 76.

The output unit 19 performs a screen display.

The communication unit 21 performs wireless communication among a plurality of the image capture apparatuses 2.

The image capture apparatus selection processing unit 72 lists and displays the identification information of each of the plurality of the image capture apparatuses 2 corresponding to each of the image capture apparatuses 2 capable of the synchronous photographing on the screen display at the output unit 19 and selects image capture apparatuses that participate in synchronous photographing.

The live shutter processing unit 76 instructs to execute synchronous photographing by a plurality of the image capture apparatuses selected by the image capture apparatus selection processing unit 72 by the communication unit 21 in response to a user's operation.

With such a configuration, it is possible to grasp easily the image capture apparatuses 2 capable of the synchronous photographing in the image capture control apparatus 1, and once the user sees the image capture control apparatus 1, it is possible to grasp the image capture apparatuses 2 capable of the synchronous photographing, and it is possible to perform setting of the synchronous photographing easier in a case of performing the synchronous photographing with a plurality of image capture apparatuses.

It should be noted that the present invention is not to be limited to the aforementioned embodiment, and that modifications, improvements, etc. within a scope that can achieve the object of the present invention are also included in the present invention.

In the abovementioned embodiment, although the test shutter processing unit 95 executes a photographing sequence until just before exposure and the live shutter processing unit 96 performs photographing in the latest timing in a case of performing the photographing sequence despite the photographing sequence already having been executed, the present invention is not limited thereto.

For example, the test shutter processing unit 95 executes the photographing sequence until just before the exposure and measures a time period until the execution, and in the live shutter processing unit 96, it may be configured so as to execute the photographing sequence and perform photographing to adjust to match an image capture apparatus 2 having the latest time of the photographing sequence until just before the exposure.

Furthermore, for example, the test shutter processing unit 95 executes the photographing sequence until just before the exposure, and in the live shutter processing unit 96, it may be configured so as to perform photographing without executing the photographing sequence and adjusting a time period required for the photographing sequence. In such a case, since the photographing sequence has already been executed in the test shutter processing, there is no difference occurring in the photographing sequence, and since it is unnecessary to take time for the photographing sequence, it is possible to photograph by synchronizing in a timing earlier than "8" of FIG. 15(*d*).

The processing sequence described above can be executed by hardware, and can also be executed by software.

In other words, the hardware configuration shown in FIG. 2, FIG. 3, etc. is merely an illustrative example, and the present invention is not particularly limited thereto. More specifically, the types of functional blocks employed to realize the above-described functions are not particularly limited to the example shown in FIG. 3, etc., so long as the image capture control system 100 can be provided with the functions enabling the aforementioned processing sequence to be executed in its entirety.

A single functional block may be configured by a single piece of hardware, a single installation of software, or any combination thereof.

Furthermore, the hardware configuration and the functional configurations included in the image capture control apparatus 1 and the image capture apparatus 2 in the abovementioned embodiments may be included in another apparatus, and are not limited to the examples of FIG. 2, FIG. 3, etc.

For example, it may be configured so that some of the image capture apparatus 2 (for example, the main-image capture apparatus 2) includes the functional configuration of the image capture control apparatus 1, in addition to the functional configuration of the image capture apparatus 2.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 30 distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) Disc, or the like. The magnetic optical disk is composed of an MD (Mini-Disk) or the like. The storage medium supplied to the user in a state incorporated in the device main body in advance may include, for example, the ROM 12 shown in FIG. 2, a hard disk included in the storage unit 20 shown in FIG. 2 or the like, in which the program is recorded.

It should be noted that, in the present specification, the steps describing the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

Furthermore, it is arbitrary as to how to divide a plurality of functions (processing, units, structures) necessary to acquire various effects as described above. An Example therefor is described below.

(Configuration 1)

A synchronous photographing system is configured to include an operation terminal that performs a photographing operation; and a plurality of image capture apparatuses that performs synchronous photographing in response to an instruction from the operation terminal, in which:

among the plurality of image capture apparatuses, one of a plurality of image capture apparatuses participating in synchronous photographing is set as a main image capture apparatus and other image capture apparatuses are set as sub image capture apparatuses, the main image capture apparatus performs control to perform synchronization of a photographing timing among the plurality of image capture apparatuses participating in synchronous photographing, and the operation terminal performs control to instruct the plurality of image capture apparatuses to perform instruction contents from a user.

(Configuration 2)

It is further configured in the abovementioned configuration that, in a case of performing wireless communication between any apparatuses including the operation terminal and the plurality of image capture apparatuses, one of the plurality of image capture apparatuses participating in synchronous photographing is set as an access point for wireless communication, and other image capture apparatuses other than the image capture apparatus that was set as the access point for wireless communication and the operation terminal are set as stations for wireless communication.

(Configuration 3)

It is further configured in the abovementioned configuration that the main image capture apparatus is set as an access point, and the operation terminal and the sub image capture apparatus are set as stations.

(Configuration 4)

It is further configured in the abovementioned configuration that the operation terminal includes a display unit that performs a screen display, and the operation terminal lists and displays identification information of each image capture apparatus corresponding to each of the plurality of image capture apparatuses capable of synchronous photographing on a screen display of the display unit, and selects image capture apparatuses to participate in synchronous photographing.

(Configuration 5)

It is further configured in the abovementioned configuration that the operation terminal identifies and displays the main image capture apparatus and the sub image capture apparatus on the screen display of the display unit.

(Configuration 6)

It is further configured in the abovementioned configuration that the operation terminal selects a profile image that is identification information for each of the plurality of image capture apparatuses from among a predetermined plurality of profile images, or displays the profile image in a selectable manner from among registered profile images created from photographed images arbitrarily selected, on the screen display at the display unit.

(Configuration 7)

It is further configured in the abovementioned configuration that the operation terminal receives a live view image of an image capture apparatus corresponding to a profile image selected according to a selection of a profile image listed and displayed on the screen display of the display unit, and displays the live view image of the image capture apparatus in place of a corresponding profile image.

(Configuration 8)

It is further configured in the abovementioned configuration that, with an instruction from the operation terminal, a photographing condition is set in each of the image capture apparatuses or collectively in all of the image capture apparatuses participating in synchronous photographing, by an instruction from the operation terminal.

(Configuration 9)

It is further configured in the abovementioned configuration that an instruction from the operation terminal selects whether to adjust a photographing condition of the sub image capture apparatus to match a photographing condition of the main image capture apparatus or to set a photographing condition designated by a user by operation of the operation terminal in a plurality of image capture apparatuses is selected.

(Configuration 10)

A synchronous photographing system is configured so as to include: an operation terminal that performs a photographing operation; and a plurality of image capture apparatuses that performs synchronous photographing in response to an instruction from the operation terminal, in which, in a case of performing wireless communication between any apparatuses including the operation terminal that performs a photographing operation and the plurality of image capture apparatuses in response to an instruction from the operation terminal, one of the plurality of image capture apparatuses participating in synchronous photographing is set as an access point for wireless communication and other image capture apparatuses other than the image capture apparatus which was set as an access point for the wireless communication and the operation terminal are set as stations for wireless communication.

(Configuration 11)

It is further configured in the abovementioned configuration that the operation terminal includes a display unit that performs a screen display, each of the image capture apparatuses has an access point selection function that lists and displays connectable access points for selection when connecting to wireless LAN, and, in a case in which a synchronous photographing mode is selected on a screen display at the display unit, after initially setting a image capture apparatus to be an access point, when a image capture apparatus which is set as a station selects an access point, the operation terminal is configured so as not to display as an option an access point that is an apparatus unrelated to synchronous photographing.

(Configuration 12)

It is further configured in the abovementioned configuration that any of the plurality of image capture apparatuses also serves a function of the operation terminal.

(Configuration 13)

It is further configured in the abovementioned configuration that any of the plurality of image capture apparatuses also serves as a function of the operation terminal.

(Configuration 14)

An operation terminal is configured so as to include: an output unit that performs a screen display; a communication unit that performs wireless communication among a plurality of image capture apparatuses; a control unit that acquires identification information from each of the plurality of image capture apparatuses by way of the communication unit, lists and displays the identification information of each of the plurality of image capture apparatuses acquired on a screen display at the output unit, and selects a plurality of image capture apparatuses to participate in synchronous photographing in response to a user's operation; and an input unit that instructs to execute synchronous photographing by a plurality of image capture apparatuses selected by the selection unit by the wireless communication unit in response to a user's operation.

(Configuration 15)

It is further configured in the abovementioned configuration that one of the plurality of image capture apparatuses participating in the synchronous photographing is set as a main image capture apparatus and other image capture apparatuses are set as sub image capture apparatuses, and the control unit identifies and displays the main image capture apparatus and the sub image capture apparatuses on the screen display of the output unit.

(Configuration 16)

It is further configured in the abovementioned configuration that the control unit selects a profile image which is identification information for each of the plurality of image capture apparatuses from among a predetermined plurality of profile images, or displays the profile image in a selectable manner from among registered profile images created from photographed images arbitrarily selected, on the screen display of the output unit.

(Configuration 17)

It is further configured in the abovementioned configuration that the control unit receives a live view image of a image capture apparatus corresponding to a profile image selected by a selection from the profile images listed and displayed on the screen display at the output unit and displays the live view image of the image capture apparatus in place of a corresponding profile image.

(Configuration 18)

It is further configured in the abovementioned configuration that the control unit sets a photographing condition in each of the image capture apparatuses or collectively in all of the image capture apparatuses participating in synchronous photographing in response to a user's operation by way of the communication unit.

(Configuration 19)

A synchronous photographing method executed by a synchronous photographing system including: an operation terminal that performs a photographing operation; and a plurality of image capture apparatuses that performs synchronous photographing in response to an instruction from the operation terminal, is configured so as to include: among the plurality of image capture apparatuses, setting one of a plurality of image capture apparatuses participating in synchronous photographing as a main image capture apparatus and other image capture apparatuses as sub image capture apparatuses, in the main image capture apparatus, performing control to perform synchronization of a photographing timing among the plurality of image capture apparatuses participating in synchronous photographing, and in the operation terminal, performing control to instruct the plurality of image capture apparatuses to perform instruction contents from a user.

(Configuration 20)

A synchronous photographing method that can be executed by a synchronous photographing system including: an operation terminal that performs a photographing operation; and a plurality of image capture apparatuses that performs synchronous photographing in response to an instruction from the operation terminal, is configured so as to include: in a case of performing wireless communication between any apparatuses including the operation terminal that performs a photographing operation and the plurality of image capture apparatuses in response to an instruction from the operation terminal, setting such that one of the plurality of image capture apparatuses participating in synchronous photographing is set as an access point for wireless communication and other image capture apparatuses other than the image capture apparatus which was set as an access point for the wireless communication and the operation terminal are set as stations for wireless communication.

What is claimed is:

1. A synchronous photographing system which enables wireless communication among arbitrary devices by a wireless communication system in which one device relays wireless communication among a plurality of other devices, the system comprising:
    an operation terminal comprising a processor that performs a photographing operation; and
    a plurality of image capture apparatuses which each comprise a processor and an image sensor, and which perform synchronous photographing in response to an instruction from the operation terminal,
    wherein:
    the operation terminal performs control to instruct the plurality of image capture apparatuses to perform instruction contents from a user, by performing communication with the image capture apparatuses using wireless communication according to the wireless communication system,
    the operation terminal selects, from among a plurality of the image capture apparatuses which are participating in the synchronous photographing, a main image capture apparatus that has a function of synchronizing photographing timing of the plurality of image capture apparatuses, the function being different from a function of relaying wireless communication according to the wireless communication system,
    the selected main image capture apparatus uses wireless communication according to the wireless communication system to transmit a signal in order to synchronize photographing timing with regard to the other image capture apparatuses among the plurality of image capture apparatuses, so as to perform control to synchronize photographing timing among the plurality of image capture apparatuses participating in the synchronous photographing, and
    one of the image capture apparatuses from among the plurality of image capture apparatuses participating in the synchronous photographing is a device that relays wireless communication according to the wireless communication system.

2. The synchronous photographing system according to claim 1, wherein the main image capture apparatus, that has a function of synchronizing photographing timing of the plurality of image capture apparatuses, concurrently also executes a function of relaying wireless communication according to the wireless communication system.

3. The synchronous photographing system according to claim 2, wherein the wireless communication system is a Wi-Fi communication standard, and an access point in the Wi-Fi communication standard executes the relay function.

4. The synchronous photographing system according to claim 1,
    wherein the operation terminal includes a display unit that performs a screen display, and
    wherein the operation terminal lists and displays identification information of each image capture apparatus corresponding to each of the plurality of image capture apparatuses capable of synchronous photographing on a screen display of the display, and selects image capture apparatuses from among the plurality of image capture apparatuses to participate in synchronous photographing.

5. The synchronous photographing system according to claim 4, wherein the operation terminal identifies and displays, on the screen display of the display, the main image capture apparatus and the other image capture apparatuses participating in the synchronous photographing.

6. The synchronous photographing system according to claim 4, wherein the operation terminal selects a profile image that is identification information for each of the plurality of image capture apparatuses from among a predetermined plurality of profile images, or displays the profile image in a selectable manner from among registered profile images created from photographed images arbitrarily selected, on the screen display of the display.

7. The synchronous photographing system according to claim 6, wherein the operation terminal receives a live view image of an image capture apparatus corresponding to a profile image selected according to a selection of a profile image listed and displayed on the screen display of the display, and displays the live view image of the image capture apparatus in place of a corresponding profile image.

8. The synchronous photographing system according to claim 1, wherein a photographing condition is set in each of the image capture apparatuses or collectively in all of the image capture apparatuses participating in synchronous photographing, by an instruction from the operation terminal.

9. The synchronous photographing system according to claim 1, wherein an instruction from the operation terminal selects whether to adjust a photographing condition of the other image capture apparatuses other than the main image capture apparatus which are participating in the synchronous photographing to match a photographing condition of the main image capture apparatus, or to set a photographing condition designated by a user by operation of the operation terminal in a plurality of the image capture apparatuses.

10. A synchronous photographing method executed by a synchronous photographing system which enables wireless communication among arbitrary devices by a wireless communication system in which one device relays wireless communication among a plurality of other devices, the system including: an operation terminal that performs a photographing operation; and a plurality of image capture apparatuses that perform synchronous photographing in response to an instruction from the operation terminal, the method comprising:

in the operation terminal, performing control to instruct the plurality of image capture apparatuses to perform instruction contents from a user, by performing communication with the image capture apparatuses using wireless communication according to the wireless communication system, in the operation terminal, selecting, from among a plurality of the image capture apparatuses which are participating in the synchronous photographing, a main image capture apparatus that has a function of synchronizing photographing timing of the plurality of image capture apparatuses, the function being different from a function of relaying wireless communication according to the wireless communication system, wherein the selected main image capture apparatus uses wireless communication according to the wireless communication system to transmit a signal in order to synchronize photographing timing with regard to the other image capture apparatuses among the plurality of image capture apparatuses, so as to perform control to synchronize photographing timing among the plurality of image capture apparatuses participating in the synchronous photographing, and wherein one of the image capture apparatuses from among the plurality of image capture apparatuses participating in the synchronous photographing is a device that relays wireless communication according to the wireless communication system.

\* \* \* \* \*